United States Patent
Yamamoto et al.

(10) Patent No.: US 10,468,679 B2
(45) Date of Patent: Nov. 5, 2019

(54) NONAQUEOUS ELECTROLYTE BATTERY INCLUDING POSITIVE ELECTRODE INCLUDING LITHIUM NICKEL COBALT MANGANESE COMPOSITE OXIDE AND NEGATIVE ELECTRODE INCLUDING SPINEL TYPE LITHIUM TITANATE, AND NONAQUEOUS ELECTROLYTE

(71) Applicant: KABUSHIKI KAISHA TOSHIBA, Minato-ku (JP)

(72) Inventors: Dai Yamamoto, Kashiwazaki (JP); Yuki Watanabe, Kashiwazaki (JP); Tetsuro Kano, Kashiwazaki (JP); Nobuyasu Negishi, Kashiwazaki (JP); Hidesato Saruwatari, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 107 days.

(21) Appl. No.: 15/454,454

(22) Filed: Mar. 9, 2017

(65) Prior Publication Data
US 2017/0271671 A1    Sep. 21, 2017

Related U.S. Application Data

(63) Continuation of application No. PCT/JP2016/058150, filed on Mar. 15, 2016.

(51) Int. Cl.
   *H01M 4/485*  (2010.01)
   *H01M 4/525*  (2010.01)
   (Continued)

(52) U.S. Cl.
   CPC ......... *H01M 4/525* (2013.01); *H01M 4/485* (2013.01); *H01M 4/505* (2013.01);
   (Continued)

(58) Field of Classification Search
   None
   See application file for complete search history.

(56) References Cited

U.S. PATENT DOCUMENTS

2002/0064712 A1* 5/2002 Sekino ............ H01M 10/0569
                                                       429/330
2004/0096740 A1   5/2004 Fukuzawa et al.
(Continued)

FOREIGN PATENT DOCUMENTS

JP    2000-012090 A   *  1/2000
JP    2002025630  A   *  1/2002
(Continued)

OTHER PUBLICATIONS

English Translation of JP-2002025630-A to Okuda et al. (Year: 2002).*

(Continued)

*Primary Examiner* — Lucas J. O'Donnell
(74) *Attorney, Agent, or Firm* — Oblon, McClelland, Maier & Neustadt, L.L.P.

(57) ABSTRACT

According to one embodiment, there is provided a nonaqueous electrolyte battery including a positive electrode, a negative electrode and a nonaqueous electrolyte. The positive electrode includes a positive electrode active material layer including a lithium nickel cobalt manganese composite oxide. The negative electrode includes a negative electrode active material layer including a spinel type lithium titanate. The nonaqueous electrolyte has an ion conductivity of not less than 7 mS/cm and not more than 10 mS/cm at 25° C. A capacity ratio p/n is within a range of not less than 1.4 and not more than 1.8. A thickness ratio $T_p/T_n$ is within a range of not less than 1.05 and less than 1.3. A ratio $P_p/P_n$ is within a range of not less than 0.55 and less than 0.8.

14 Claims, 3 Drawing Sheets

(51) Int. Cl.
*H01M 4/505* (2010.01)
*H01M 10/0525* (2010.01)
*H01M 10/0569* (2010.01)
*H01M 10/06* (2006.01)
*H01M 16/00* (2006.01)
*H01M 4/02* (2006.01)
*H01M 6/50* (2006.01)

(52) U.S. Cl.
CPC ... *H01M 10/0525* (2013.01); *H01M 10/0569* (2013.01); *H01M 10/06* (2013.01); *H01M 16/00* (2013.01); *H01M 2004/021* (2013.01); *H01M 2006/5094* (2013.01); *H01M 2300/0037* (2013.01)

(56) References Cited

U.S. PATENT DOCUMENTS

| | | | |
|---|---|---|---|
| 2006/0216600 A1* | 9/2006 | Inagaki | H01M 2/06 429/231.1 |
| 2007/0009797 A1* | 1/2007 | Takami | H01M 2/1077 429/231.1 |
| 2007/0231693 A1 | 10/2007 | Inagaki et al. | |
| 2008/0020279 A1* | 1/2008 | Schmidt | H01M 4/131 429/221 |
| 2012/0156529 A1 | 6/2012 | Watanabe et al. | |
| 2013/0316242 A1* | 11/2013 | Matsuno | H01M 4/131 429/231.1 |
| 2014/0234682 A1* | 8/2014 | Kwon | H01M 10/0525 429/94 |
| 2016/0099481 A1 | 4/2016 | Akagawa et al. | |

FOREIGN PATENT DOCUMENTS

| | | |
|---|---|---|
| JP | 2002-203602 | 7/2002 |
| JP | 2004-171955 | 6/2004 |
| JP | 2004-296256 | 10/2004 |
| JP | 2006-108113 | 4/2006 |
| JP | 2007-87909 | 4/2007 |
| JP | 2007-273154 | 10/2007 |
| JP | 2012-43709 | 3/2012 |
| JP | 2014-110228 | 6/2014 |
| KR | 10-2016-0010411 A | 1/2016 |
| WO | WO 2015/029084 A1 | 3/2015 |
| WO | WO 2015/041167 A1 | 3/2015 |

OTHER PUBLICATIONS

English Translation of JP2000-012090A (Year: 2000).*
International Search Report dated Jun. 21, 2016 in PCT/JP2016/058150, filed on Mar. 15, 2016 ( with English Translation of Categories of Cited Documents).
Written Opinion dated Jun. 21, 2016 in PCT/JP2016/058150, filed on Mar. 15, 2016.

* cited by examiner

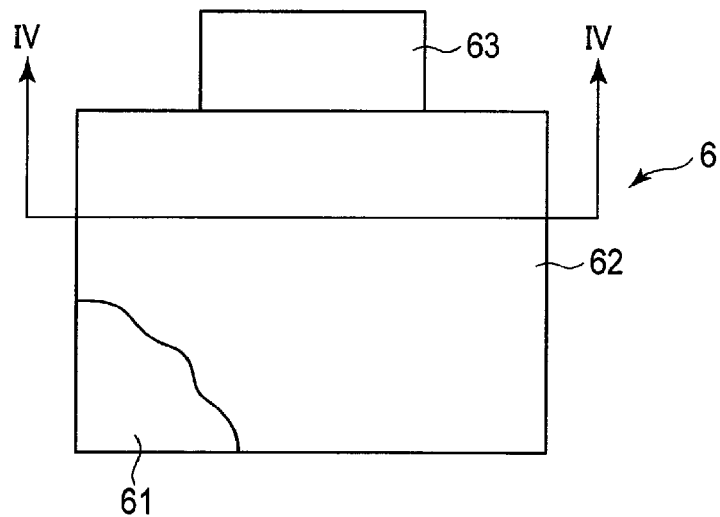
F I G. 3
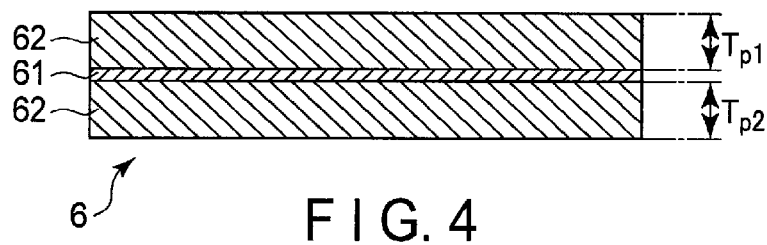
F I G. 4
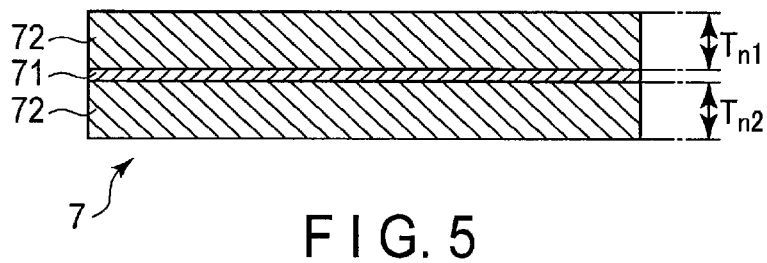
F I G. 5

NONAQUEOUS ELECTROLYTE BATTERY INCLUDING POSITIVE ELECTRODE INCLUDING LITHIUM NICKEL COBALT MANGANESE COMPOSITE OXIDE AND NEGATIVE ELECTRODE INCLUDING SPINEL TYPE LITHIUM TITANATE, AND NONAQUEOUS ELECTROLYTE

CROSS-REFERENCE TO RELATED APPLICATIONS

This application is a Continuation application of PCT Application No. PCT/JP2016/058150, filed Mar. 15, 2016, the entire contents of which are incorporated herein by reference.

FIELD

Embodiments of the present invention relate to a nonaqueous electrolyte battery and a battery system.

BACKGROUND

In a nonaqueous electrolyte battery using a carbon-based active material in a negative electrode, there is a problem that degradation of the negative electrode is accelerated at each of the ends of charge and discharge. Thus, in the nonaqueous electrolyte battery using the carbon-based active material in the negative electrode, there is adopted a design in which the capacity of the negative electrode is excessively increased with respect to the capacity of a positive electrode. According to such a design, a use range of the negative electrode is limited, and the degradation of the negative electrode can be prevented.

However, in a battery designed such that the capacity of one of the positive and negative electrodes is excessively increased with respect to the capacity of the other electrode, a surplus capacity is generated, and therefore, it is disadvantage in terms of energy density.

On the other hand, in a nonaqueous electrolyte battery including a negative electrode including a lithium titanate, degradation of the negative electrode at each of the ends of charge and discharge is extremely small. Thus, in the nonaqueous electrolyte battery including the negative electrode including the lithium titanate, it is not necessary to adopt such a design that the capacity of the negative electrode is made excessive in order to prevent the degradation of the negative electrode.

BRIEF DESCRIPTION OF THE DRAWINGS

FIG. 3 is a schematic plane view of a positive electrode included in the nonaqueous electrolyte battery shown in FIG. 1.

FIG. 4 is a schematic cross-sectional view along the line segment IV-IV of the positive electrode shown in FIG. 3.

FIG. 5 is a schematic cross-sectional view of a negative electrode included in the nonaqueous electrolyte battery shown in FIG. 1.

DETAILED DESCRIPTION

Figure 1:
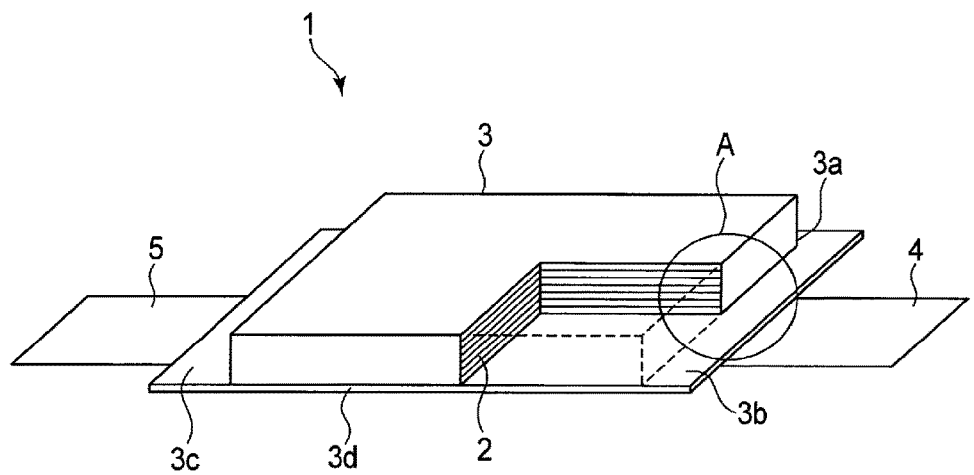
FIG. 1 is a schematic cut-away perspective view of an example of a nonaqueous electrolyte battery according to a first embodiment.

According to one embodiment, there is provided a nonaqueous electrolyte battery including a positive electrode, a negative electrode and a nonaqueous electrolyte. The positive electrode includes a positive electrode active material layer. The positive electrode active material layer includes a lithium nickel cobalt manganese composite oxide. The negative electrode includes a negative electrode active material layer. The negative electrode active material layer includes a spinel type lithium titanate. The nonaqueous electrolyte has an ion conductivity of not less than 7 mS/cm and not more than 10 mS/cm at 25° C. A capacity ratio p/n is within a range of not less than 1.4 and not more than 1.8. The thickness ratio $T_p/T_n$ is within a range of not less than 1.05 and less than 1.3. A ratio $P_p/P_n$ is within a range of not less than 0.55 and less than 0.8. p is a capacity per unit area of the positive electrode. n is a capacity per unit area of the negative electrode. $T_p$ is a thickness of the positive electrode active material layer. $T_n$ is a thickness of the negative electrode active material layer. $P_p$ is a porosity of the positive electrode active material layer per 1 μm of the thickness of the positive electrode active material layer. $P_n$ is a porosity of the negative electrode active material layer per 1 μm of the thickness of the negative electrode active material layer.

According to the embodiment, a battery system is provided. The battery system includes a first battery unit and a second battery unit connected to the first battery unit in parallel. The first battery unit includes a lead-acid storage battery. The second battery unit includes the nonaqueous electrolyte battery according to the first embodiment.

The embodiments will be explained below with reference to the drawings. In this case, the structures common to all embodiments are represented by the same symbols and duplicated explanations will be omitted. Also, each drawing is a typical view for explaining the embodiments and for promoting an understanding of the embodiments. Though there are parts different from an actual device in shape, dimension and ratio, these structural designs may be properly changed taking the following explanations and known technologies into consideration.

First Embodiment

According to a first embodiment, there is provided a nonaqueous electrolyte battery including a positive electrode, a negative electrode and a nonaqueous electrolyte. The positive electrode includes a positive electrode active material layer. The positive electrode active material layer includes a lithium nickel cobalt manganese composite oxide. The negative electrode includes a negative electrode active material layer. The negative electrode active material layer includes a spinel type lithium titanate. The nonaqueous electrolyte has an ion conductivity of not less than 7 mS/cm and not more than 10 mS/cm at 25° C. A capacity ratio p/n is within a range of not less than 1.4 and not more than 1.8. The thickness ratio $T_p/T_n$ is within a range of not less than 1.05 and less than 1.3. A ratio $P_p/P_n$ is within a range of not less than 0.55 and less than 0.8. p is a capacity per unit area of the positive electrode. n is a capacity per unit area of the negative electrode. $T_p$ is a thickness of the positive electrode active material layer. $T_n$ is a thickness of the negative electrode active material layer. $P_p$ is a porosity of the positive electrode active material layer per 1 μm of the thickness of the positive electrode active material layer. $P_n$ is a porosity of the negative electrode active material layer per 1 μm of the thickness of the negative electrode active material layer.

Examples of measures to enhance output of the nonaqueous electrolyte battery include the use of a nonaqueous electrolyte having an excellent ion-conductivity. However, the present inventors found, in the research and development, that the nonaqueous electrolyte excellent in ion conductivity is susceptible to an oxidative degradation or the like, and may cause swelling and degradation of the nonaqueous electrolyte battery.

In order to solve this problem, as measures to suppress an oxidative degradation of the nonaqueous electrolyte excellent in ion conductivity, the present inventors considered to increase the capacity of a positive electrode with respect to the capacity of a negative electrode and keep a low state-of-charge of the positive electrode during charge and discharge of a nonaqueous electrolyte battery. It is found that, according to such measures, the potential of the positive electrode can be prevented from becoming too high, so that oxidative degradation of the nonaqueous electrolyte caused by the potential of the positive electrode can be suppressed.

Such measures can adjust an average operating voltage of a battery unit configured by connecting batteries to each other in series such that the average operating voltage is excellent in compatibility with the operating voltage of a battery unit including a lead-acid storage battery.

However, in such a battery that a ratio of a positive electrode capacity and a negative electrode capacity (capacity ratio p/n) greatly exceeds 1, a charge-and-discharge cycle may be repeated in such a state where a small amount of Li has been extracted from a positive electrode. It is found that, in the nonaqueous electrolyte battery repeatedly subjected to the charge-and-discharge cycles in such a state, compared with a nonaqueous electrolyte battery in which the capacity ratio p/n is approximately 1, input and output characteristics after the charge-and-discharge cycles are lowered. As a result of intensive search, the present inventors found out that the cause of this problem is that a Li-ion concentration is excessively biased in an electrolyte in a positive electrode and a negative electrode, whereby distribution of a depth of charge (a bias of the Li ion concentration in a positive electrode active material layer) occurs in a thickness direction of an electrode active material layer (a direction in which a current collector and a separator face each other), so that degradation of the crystal structure in a positive electrode active material progresses.

Further, the present inventors have found that a bias of a depth of charge/discharge in the positive and negative electrode active material layers is more significant in a nonaqueous electrolyte battery using a nonaqueous electrolyte having higher ion conductivity.

Based on the findings, the present inventors have focused attention on that in order to make good use of a nonaqueous electrolyte having high ion conductivity in a nonaqueous electrolyte battery in which the positive electrode capacity is higher than the negative electrode capacity, it is important to keep a balance of movement of Li ions in an electrolyte between a positive electrode and a negative electrode. As a result of intensive studies based on this idea, the present inventors have achieved a nonaqueous electrolyte battery according to a first embodiment.

The nonaqueous electrolyte battery according to the first embodiment has the above described configuration, thereby can suppress degradation of the crystal structure of a positive electrode active material to exhibit excellent life characteristics and, at the same time, can exhibit excellent rate characteristics. The reason will be hereinafter described in detail.

First, the nonaqueous electrolyte battery according to the first embodiment using a lithium nickel cobalt manganese composite oxide in a positive electrode can exhibit a high energy density.

Lithium titanate having a spinel type structure can cause insertion and extraction reactions of lithium at a potential of 1.0 V (vs. Li/Li$^+$) or more. Thus, a nonaqueous electrolyte battery using lithium titanate having a spinel type structure in a negative electrode can suppress precipitation of metal lithium accompanying charge and discharge, in particular rapid charge and discharge. Thus, the nonaqueous electrolyte battery according to the first embodiment using spinel type lithium titanate in a negative electrode can exhibit excellent life characteristics and excellent rapid-charge-and-discharge characteristics.

In the nonaqueous electrolyte battery according to the first embodiment, when the capacity ratio p/n of a capacity p per unit area of a positive electrode to a capacity n per unit area of a negative electrode is within a range of not less than 1.4 and not more than 1.8, the potential of the positive electrode can be prevented from becoming too high in a charge-and-discharge cycles. Consequently, the nonaqueous electrolyte battery according to the first embodiment can prevent oxidative degradation of a nonaqueous electrolyte having an ion conductivity of not less than 7 mS/cm and not more than 10 mS/cm at 25° C.

Further, the nonaqueous electrolyte battery according to the first embodiment, due to the following reasons, can prevent occurrence of the bias of the depth of charge/discharge in a positive electrode active material layer and a negative electrode active material layer.

First, the fact that a thickness ratio $T_p/T_n$ of a thickness $T_p$ of the positive electrode active material layer to a thickness $T_n$ of the negative electrode active material layer is within a range of not less than 1.05 and less than 1.3 means that a difference between the thickness $T_p$ of the positive electrode active material layer and the thickness $T_n$ of the negative electrode active material layer is small. In the nonaqueous electrolyte battery according to the first embodiment in which the thickness ratio $T_p/T_n$ is within the range of not less than 1.05 and less than 1.3, it can be said that a distance from a surface of a positive current collector to a surface of the positive electrode active material layer (for example, a surface in contact with a separator) is comparable to a distance from a surface of a negative current collector to a surface of the negative electrode active material layer (for example, a surface in contact with the separator).

During charge and discharge, in the entire nonaqueous electrolyte included in the nonaqueous electrolyte battery, including a nonaqueous electrolyte impregnated in the positive electrode active material layer and a nonaqueous electrolyte impregnated in the negative electrode active material layer, Li ions diffuse in a direction in which the positive electrode active material layer and the negative electrode active material layer face each other. Thus, in the positive electrode and the negative electrode having comparable distances from a current collector surface to an active material layer surface, Li-ion-diffusion distances are also comparable.

In the nonaqueous electrolyte battery according to the first embodiment, since the Li ion diffusion distances in the positive electrode and the negative electrode can be made comparable, it is possible to suppress the bias of the Li-ion concentration in an electrolyte between the positive electrode and the negative electrode due to a difference in diffusion distance.

Next, the ratio $P_p/P_n$ is adjusted to fall within a range of not less than 0.55 and less than 0.8, whereby, due to the following reasons, it is possible to suppress the bias of the Li ion concentration in the electrolyte between the positive electrode and the negative electrode in each microscopic region near each electrode interface. Here, $P_p$ is the porosity of the positive electrode active material layer per 1 μm of the thickness of the positive electrode active material layer. Meanwhile, $P_n$ is the porosity of the negative electrode active material layer per 1 μm of the thickness of the negative electrode active material layer. The porosity per 1 μm of the thickness of each electrode active material layer can be obtained by dividing the porosity of each electrode active material layer by the thickness of each electrode active material layer.

As described above, during charge-and-discharge cycles of a battery, although Li ions may diffuse in the thickness direction of the positive electrode active material layer and the thickness direction of the negative electrode active material layer, further focusing on a reaction at microscopic electrode interfaces (for example, a reaction at an interface between a positive electrode active material surface and an electrolyte, and a reaction at an interface between a negative electrode active material surface and the electrolyte), it has been found that the bias of the Li ion concentration between the positive electrode and the negative electrode is strongly affected by the type of the electrode active materials and an abundance ratio of a nonaqueous electrolyte. Specific examples are as follows. At first, spinel type lithium titanate is more excellent in life characteristics than a lithium nickel cobalt manganese composite oxide included in a positive electrode, and makes it easily possible to increase a specific surface area. Moreover, interface reaction resistance thereof is small, and overvoltage to be loaded to the lithium titanate accompanying insertion of Li and extraction reaction is low. As a result of repeated studies, it has been found that in a negative electrode including a negative electrode active material layer including such spinel type lithium titanate, an amount of a nonaqueous electrolyte per 1 μm of the thickness of an electrode active material layer required in charge and discharge is relatively large as compared to a positive electrode including a lithium nickel cobalt manganese composite oxide. Further, it has been found that the amount of a nonaqueous electrolyte capable of being used by an active material near a surface of an electrode active material layer during charge and discharge has a correlation with a pore volume in the electrode active material layer.

Furthermore, Li ions inserted and extracted due to charge or discharge reaction move through an electrolyte in an electrode. It has been found that the ease of movement in such case has a correlation with the pore volume in the electrode active material layer.

The nonaqueous electrolyte battery according to the first embodiment in which the ratio $P_p/P_n$ between porosities of the electrode active material layers per 1 μm of the thickness is not less than 0.55 and less than 0.8 is excellent in a balance among the pore volume near a surface of a positive electrode active material layer, the pore volume near a surface of a negative electrode active material, reactivity of a lithium nickel cobalt manganese composite oxide, and reactivity of spinel type lithium titanate, so that it is possible to suppress the bias of the Li-ion concentration between a positive electrode and a negative electrode in each microscopic region near each electrode interface. Moreover, by keep balance in mobility in an electrode thickness direction, the bias of the Li-ion concentration in a macroscopic view can be also suppressed.

Namely, in the nonaqueous electrolyte battery according to the first embodiment, in both macroscopic and microscopic views, it is possible to suppress the bias of the Li-ion concentration in the electrolyte between the positive electrode and the negative electrode.

Thus, in the nonaqueous electrolyte battery according to the first embodiment, it is possible to suppress the bias of the Li-ion concentration between the positive electrode and the negative electrode while reducing oxidative degradation of the nonaqueous electrolyte having an ion conductivity of not less than 7 mS/cm and not more than 10 mS/cm at 25° C. From these results, the nonaqueous electrolyte battery according to the first embodiment can exhibit excellent life characteristics and rate characteristics.

On the other hand, as described above, the bias of the Li-ion concentration in the electrolyte between the positive electrode and the negative electrode causes a difference in progression of an electrode reaction in a positive electrode active material layer or a negative electrode active material layer.

Due to the difference in progression of the electrode reaction, a region entering an over-discharged state or an over-charged state beyond a normal operating range appears in the positive electrode active material layer or the negative electrode active material layer during charge and discharge. If there is such a region, overvoltage occurs, so that the rate characteristics are lowered. In particular, in a nonaqueous electrolyte battery subjected to the charge-and-discharge cycles in such a state where a small amount of Li had been extracted from a positive electrode, crystal structure degradation in a positive electrode active material may progress due to the difference in progression of the electrode reaction. In addition, in such a nonaqueous electrolyte battery, a side reaction of an electrolytic solution may increase at a positive electrode interface. If the side reaction occurs, an interfacial film may grow so that positive electrode resistance may increase. If the positive electrode resistance increases, a load on a positive electrode active material increases in the charge-and-discharge cycles. As a result, deterioration of the life characteristics is accelerated.

For example, in a nonaqueous electrolyte battery in which the thickness ratio $T_p/T_n$ is less than 1, the diffusion distance in a negative electrode active material layer is longer than the diffusion distance in a positive electrode active material layer, and the bias of the Li-ion concentration between a positive electrode and a negative electrode increases. Specifically, since a movement distance is long in an electrolyte on the negative electrode side, the amount of Li ions required for a reaction tends to be insufficient or excessive, and progression of charge and discharge in a negative electrode layer is biased. As a result, in such a nonaqueous electrolyte battery, the rate characteristics are deteriorated, for example.

In a nonaqueous electrolyte battery in which the thickness ratio $T_p/T_n$ is not less than 1 and less than 1.05, when the ratio of the porosity is adjusted to fall within a preferable range, the bias of the Li-ion concentration between a positive electrode and a negative electrode increases. In order to keep a balance of the Li-ion concentration, a difference in mobility due to the ratio of the porosity is required to be considered in addition to the diffusion distance.

On the other hand, in a nonaqueous electrolyte battery in which the thickness ratio $T_p/T_n$ is 1.3 or more, the diffusion distance in a positive electrode active material layer is much longer than the diffusion distance in a negative electrode active material layer, and the bias of the Li-ion concentration between a positive electrode and a negative electrode increases. Specifically, since the movement distance is long in an electrolyte on the positive electrode side, the amount of Li ions required for a reaction tends to be insufficient or excessive, and progression of charge and discharge in a positive electrode layer is biased. The bias of Li-ion concentration in an electrolyte in a positive electrode active material layer increases. As a result, in such a nonaqueous electrolyte battery, the positive electrode tends to enter the over-charged state or the over-discharged state, and the life characteristics are deteriorated. In the positive electrode, overvoltage occurs, and the rate characteristics are deteriorated.

In a nonaqueous electrolyte battery in which the ratio $P_p/P_n$ between porosities of the electrode active material layers per 1 μm of a thickness of each electrode active material layer is less than 0.55, the pore volume of a positive electrode active material layer is relatively small. In such a nonaqueous electrolyte battery, an amount of an electrolyte layer on the positive electrode side, that is, an amount a nonaqueous electrolyte impregnated in a positive electrode active material layer is relatively small, and during charge and discharge, Li ions cannot be fully exchanged at the positive electrode. Thus, in such a nonaqueous electrolyte battery, the bias of the Li-ion concentration in the positive electrode active material layer increases during charge and discharge, and the rate characteristics and the life characteristics are deteriorated.

On the other hand, in a nonaqueous electrolyte battery in which the ratio $P_p/P_n$ between the porosities of the electrode active material layers per 1 μm of a thickness of each electrode active material layer is 0.8 or more, the pore volume of a negative electrode active material layer is relatively small. In such a nonaqueous electrolyte battery, an amount of an electrolyte layer on the negative electrode side, that is, an amount of a nonaqueous electrolyte impregnated in a negative electrode active material layer is insufficient, and during charge and discharge, Li ions cannot be fully exchanged at the negative electrode. Thus, in such a nonaqueous electrolyte battery, the bias of the Li-ion concentration in the negative electrode active material layer increases during charge and discharge, and the rate characteristics are deteriorated.

A nonaqueous electrolyte battery in which the capacity ratio p/n is less than 1.4 cannot satisfactorily prevent a potential of a positive electrode from becoming high in such a state that a state-of-charge is high. On the other hand, in a nonaqueous electrolyte battery in which the capacity ratio p/n is more than 1.8, a positive electrode amount not contributing to charge and discharge is too large, and high energy density cannot be exhibited.

In addition, in a nonaqueous electrolyte battery in which the ion conductivity of a nonaqueous electrolyte at 25° C. is less than 7 mS/cm, enhancement of the rate characteristics due to the nonaqueous electrolyte cannot be achieved. On the other hand, in a nonaqueous electrolyte battery in which the ion conductivity of a nonaqueous electrolyte at 25° C. is more than 10 mS/cm, there is no effect of keeping a balance of the Li-ion concentration between electrolytes of positive and negative electrodes, resistance to oxidation is lowered, and, as a result, the life characteristics are deteriorated.

The thickness ratio $T_p/T_n$ is preferably not less than 1.08 and less than 1.20. In a nonaqueous electrolyte battery in which the thickness ratio $T_p/T_n$ is within this range, a difference in substantial Li-ion diffusion distance between the positive electrode active material layer and the negative electrode active material layer can be further reduced, so that the bias of Li ions between the positive electrode and the negative electrode can be further reduced. The thickness ratio $T_p/T_n$ is more preferably not less than 1.1 and less than 1.15.

The ratio $P_p/P_n$ between porosities of electrode active material layers per 1 μm of a thickness of each electrode active material layer is preferably not less than 0.6 and less than 0.78. A nonaqueous electrolyte battery in which the ratio $P_p/P_n$ between porosities of electrode active material layers per 1 μm of the thickness of each electrode active material layer is within this range is more excellent in a balance among the pore volume near a surface of the electrode active material layer, the pore volume near a surface of a negative electrode active material, reactivity of a lithium nickel cobalt manganese composite oxide, and reactivity of spinel type lithium titanate, so that it is possible to further reduce the bias of Li ions between a positive electrode and a negative electrode. The ratio $P_p/P_n$ between porosities of the electrode active material layers per 1 μm of the thickness each the electrode active material layer is more preferably not less than 0.63 and less than 0.77.

The capacity ratio p/n is preferably not less than 1.4 and not more than 1.7. In a nonaqueous electrolyte battery in which the capacity ratio p/n is within this range, a positive electrode potential can be suppressed, decomposition of a liquid electrolyte is prevented, and keeping a balance between diffusions in a positive electrode and a negative electrode can be easy. The capacity ratio p/n is more preferably not less than 1.4 and not more than 1.6. In a nonaqueous electrolyte battery in which the capacity ratio p/n is within this range, reduction in energy density due to an excessively large positive electrode capacity can be suppressed.

The ion conductivity of a nonaqueous electrolyte is preferably not less than 7 mS/cm and not more than 9 mS/cm at 25° C. By virtue of the use of a nonaqueous electrolyte in which the ion conductivity at 25° C. is within this range, more excellent rate characteristics can be achieved. The ion conductivity of the nonaqueous electrolyte is more preferably not less than 7.5 mS/cm and not more than 8.5 mS/cm at 25° C.

The nonaqueous electrolyte battery according to the first embodiment can exhibit an operating voltage range of not more than 2.4 V, for example. Here, the operating voltage range is a voltage range in which the capacity of not less than 90% with respect to the capacity in a full charged state can be exhibited. Namely, in a nonaqueous electrolyte battery exhibiting the operating voltage range of not more than 2.4 V, even if a charge upper cutoff voltage is set to 2.4 V, the capacity of not less than 90% with respect to the capacity in the full charged state can be charged and discharged. Should be noted that such a full charged state of a nonaqueous electrolyte battery is defined by the following procedures. A nonaqueous electrolyte battery is charged at a constant current of 1 C in a thermostatic chamber maintained at 25° C. until the voltage reaches 2.8 V. Subsequently, the voltage of the nonaqueous electrolyte battery is maintained at 2.8 V for three hours as it is. After that, the nonaqueous electrolyte battery is allowed to stand in an open circuit state for 30 minutes. Next, the nonaqueous electrolyte battery is discharged at a constant current of 1 C until the voltage reaches 1.4 V. One cycle including the constant-current charge, the standing in the open circuit state, and the constant-current discharge, each of which is described above, is taken as one charge-and-discharge cycle. This charge-and-discharge cycle is repeated three times on a nonaqueous electrolyte battery to be measured. A nonaqueous electrolyte battery after charge at the third cycle is taken as a nonaqueous electrolyte battery in the full charged state.

The operating voltage range of a nonaqueous electrolyte battery can be controlled by, for example, adjusting the type of positive electrode active material, the type of negative electrode active material, and the capacity ratio p/n, in combination. For example, according to some methods shown in Examples, a nonaqueous electrolyte battery capable of exhibiting the operating voltage range of not more than 2.4 V can be achieved.

In particular, in spinel type lithium titanate, in a state-of-charge in a wide range except for the ends of charge and discharge, a change in potential accompanying a change in a state-of-charge is small. On the other hand, in spinel type lithium titanate, in a state-of-charge close to the full charged state, a large potential change can be exhibited accompanying a change in the state-of-charge. Thus, spinel type lithium titanate can exhibit charge and discharge curves each including a portion in which a potential over a wide state-of-charge is flat and a portion in which a change in potential according to the state-of-charge is steep. The nonaqueous electrolyte battery according to the first embodiment can exhibit the operating voltage range of not more than 2.4 V with the use of such charge and discharge characteristics of spinel type lithium titanate, for example.

A battery unit configured by connecting nonaqueous electrolyte batteries, each of which can exhibit the operating voltage range of not more than 2.4 V, to each other in series can exhibit more excellent voltage-compatibility with a battery unit including a lead-acid storage battery.

The nonaqueous electrolyte battery according to the first embodiment can show the operating voltage range of not less than 1.2 V and not more than 2.4 V, for example.

Next, the nonaqueous electrolyte battery according to the first embodiment will be described in more detail.

The nonaqueous electrolyte battery according to the first embodiment includes a positive electrode, a negative electrode, and a nonaqueous electrolyte.

The positive electrode includes a positive electrode active material layer. The positive electrode may further include a positive electrode current collector. A positive electrode active material layer may be formed on both surfaces or one surface of the positive electrode current collector. The positive electrode current collector may include a portion where the positive electrode active material layer is not formed on a surface. This portion may serve as a positive electrode lead, for example.

The positive electrode active material layer includes a lithium nickel cobalt manganese composite oxide. The lithium nickel cobalt manganese composite oxide can be represented by a composition formula of $Li_{1-a}Ni_xCo_yMn_zO_2$, for example. In the above composition formula, $0 \leq a \leq 1$, $x>0$, $y>0$, and $z>0$, and x, y, and z satisfy an inequality $0.1 \leq x/(y+z) \leq 1.3$.

In the above composition formula, a is a variable which may vary within the range of $0 \leq a \leq 1$ according to a state-of-charge of the lithium nickel cobalt manganese composite oxide.

In the composition formula of $Li_{1-a}Ni_xCO_yMn_zO_2$ of the lithium nickel cobalt manganese composite oxide, it is preferable that y and z are each independently within a range of not less than 0.2 and not more than 0.45. A lithium nickel cobalt manganese composite oxide in a preferred aspect can achieve high energy density, and moreover can have a wide region of a state-of-charge in which the crystal is stable. x is preferably within a range of not less than 0.4 and not more than 0.6. y is more preferably within a range of not less than 0.25 and not more than 0.35. z is preferably within a range of not less than 0.2 and not more than 0.35.

In another preferred aspect, in the above composition formula of the lithium nickel cobalt manganese composite oxide, x, y, and z satisfy inequalities $0.3 \leq x/(y+z) \leq 1.3$ and $y \geq z$.

In still another preferred aspect, in the above composition formula of the lithium nickel cobalt manganese composite oxide, x, y, and z satisfy inequalities $0.6 \leq x/(y+z) \leq 1$ and $y \geq z$.

The lithium nickel cobalt manganese composite oxide can serve as a positive electrode active material in a positive electrode active material layer. The positive electrode active material layer may include an additional positive electrode active material other than a lithium nickel cobalt manganese composite oxide. Alternatively, the positive electrode active material layer may not include an additional active material other than a lithium nickel cobalt manganese composite oxide.

Examples of the additional positive electrode active material can include a lithium nickel composite oxide and a lithium cobalt oxide.

The lithium nickel cobalt manganese composite oxide preferably accounts for 80% by weight to 100% by weight, and more preferably 90% by weight to 100% by weight, of a weight of a positive electrode active material contained in the positive electrode active material layer.

The positive electrode active material may be included, for example, in the form of particles in the positive electrode active material layer. The particles of the positive electrode active material preferably have a center particle size of particle size distribution within a range of not less than 3.0 μm and not more than 9.0 μm. The particles of the positive electrode active material more preferably have the center particle size of the particle size distribution within a range of not less than 4.0 μm and not more than 7.0 μm. The particle size distribution can be measured by a laser diffraction particle size distribution analyzer, for example.

The positive electrode active material layer may further include a binder and a conductive agent. For example, the positive electrode active material layer may be consisted of a positive electrode active material of a lithium nickel cobalt manganese composite oxide, a conductive agent, and a binder.

The porosity of the positive electrode active material layer is preferably 40% or less. If the porosity of the positive electrode active material layer is 40% or less, an electrolyte exists at a positive electrode active material interface, and diffusion of Li ions in the positive electrode active material layer can be maintained. Furthermore, active material particles can be suitably close to each other, and electron conductivity can be ensured. The porosity of the positive electrode active material layer is more preferably not less than 30% and not more than 35%.

The density of the positive electrode active material layer is preferably 2.9 g/cm$^3$ or more. If the density of the positive electrode active material layer is 2.9 g/cm$^3$ or more, the active material particles can be suitably close to each other, and the electron conductivity is ensured. The density of the positive electrode active material layer is more preferably not less than 3.0 g/cm$^3$ and not more than 3.4 g/cm$^3$.

The thickness of the positive electrode active material layer is influenced by a coating amount of a positive electrode slurry and the density of the positive electrode active material layer, for example. The porosity of the positive electrode active material layer is influenced by the particle size of the positive electrode active material, a mixing ratio of a conductive agent, a mixing ratio of a binder, and the density of the positive electrode active material layer, for example. The density of the positive electrode active material layer can be controlled by the rolling conditions at an electrode press, for example.

The negative electrode includes a negative electrode active material layer. The negative electrode may further include a negative electrode current collector. A negative electrode active material layer may be formed on both surfaces or one surface of the negative electrode current collector. The negative electrode current collector may include a portion where the negative electrode active material layer is not formed on a surface. This portion may serve as a negative electrode lead, for example.

The negative electrode active material layer includes a spinel type lithium titanate. Spinel type lithium titanate can be represented by a composition formula of $Li_{4+1}Ti_5O_{12}$ (1 varies within a range of not less than 0 and not more than 3, according to a charged and discharged state), for example, and may have a spinel type crystal structure.

Spinel type lithium titanate can serve as a negative electrode active material in a negative electrode.

The negative electrode active material may be included in the form of particles in the negative electrode active material layer, for example. The particles of the negative electrode active material preferably have a center particle size of a particle size distribution with a range of not less than 0.5 μm and not more than 2.5 μm. The negative electrode active material particles more preferably have the center particle size of the particle size distribution within a range of not less than 0.6 μm and not more than 2.0 μm. The particle size distribution can be measured by the laser diffraction particle size distribution analyzer, for example.

The negative electrode active material layer may further include a binder and a conductive agent. For example, the negative electrode active material layer may be consisted of a negative electrode active material of the spinel type lithium titanate, a conductive agent, and a binder.

The porosity of the negative electrode active material layer is preferably 55% or less. If the porosity of the negative electrode active material layer is 55% or less, an electrolyte exists at a negative electrode active material interface, diffusion of Li ions in the negative electrode active material layer can be maintained. Furthermore, active material particles can be suitably close to each other, and the electron conductivity can be ensured. The porosity of the negative electrode active material layer is more preferably not less than 30% and not more than 45%.

The density of the negative electrode active material layer is preferably 1.8 g/cm³ or more. If the density of the negative electrode active material layer is 1.8 g/cm³ or more, the active material particles can be suitably close to each other, and the electron conductivity can be ensured. The density of the negative electrode active material layer is more preferably not less than 1.9 g/cm³ and not more than 2.3 g/cm³.

The thickness of the negative electrode active material layer is influenced by a coating amount of a negative electrode slurry and the density of the negative electrode active material layer, for example. The porosity of the negative electrode active material layer is influenced by the particle size of the negative electrode active material, the mixing ratio of a conductive agent, the mixing ratio of a binder, and the density of the negative electrode active material layer, for example. The density of the negative electrode active material layer can be controlled by the rolling conditions at an electrode press, for example.

A positive electrode and a negative electrode can face each other while a separator is sandwiched between a positive electrode active material layer and a negative electrode active material layer so as to constitute an electrode group.

The structure of the electrode group thus formed is not limited particularly. For example, the electrode group may have a stack structure. In the stack structure, the positive electrodes and the negative electrodes described above are stacked with a separator provided therebetween. Alternatively, the electrode group may have a wound structure. The wound structure is a structure which is obtained by spirally winding a laminate which is obtained by stacking the positive electrode and the negative electrode described above with a separator provided therebetween.

A nonaqueous electrolyte may be held in a state of being impregnated in such an electrode group, for example.

The nonaqueous electrolyte battery according to the first embodiment may further include a container member for housing the electrode group and a nonaqueous electrolyte.

The nonaqueous electrolyte battery according to the first embodiment may furthermore include a positive electrode current-collecting tab electrically connected to the positive electrode lead and a negative electrode current-collecting tab electrically connected to the negative electrode lead. Each of the positive electrode current-collecting tab and the negative electrode current-collecting tab may be extended outside the container member to serve as each of a positive electrode terminal and a negative electrode terminal. Alternatively, the positive electrode current-collecting tab and the negative electrode current-collecting tab can be connected respectively to the positive electrode terminal and the negative electrode terminal.

Next, a material of each member that can be included in the nonaqueous electrolyte battery according to the first embodiment will be described in detail.

(1) Positive Electrode

As a positive electrode current collector, a metal foil such as aluminum or copper may be used.

The conductive agent that can be included in a positive electrode active material layer preferably includes a carbon material, as described above. Examples of the carbon material can include acetylene black, ketjen black, furnace black, graphite, and carbon nanotube. The positive electrode active material layer may include one or two or more types of the above carbon materials or further include other conductive agents.

The binder that can be contained in the positive electrode active material layer is not limited particularly. For example, as the binder, a polymer dispersed well in a mixing solvent for slurry preparation may be used. Examples of such a polymer include polyvinylidene fluoride, hexafluoropropylene, and polytetrafluoroethylene.

The contents of the positive electrode active material, the conductive agent, and the binder in the positive electrode active material layer are respectively preferably 80% by weight to 98% by weight, 1% by weight to 10% by weight, and 1% by weight to 10% by weight, based on the weight of the positive electrode active material layer, and more preferably 90% by weight to 94% by weight, 2% by weight to 8% by weight, and 1% by weight to 5% by weight, based on the weight of the positive electrode active material layer.

(2) Negative Electrode

As a negative electrode current collector, a metal foil such as aluminum or copper may be used.

As a conductive agent and a binder that can be included in a negative electrode active material layer, there can be used a conductive agent and a binder similar to those that can be included in the positive electrode active material layer, respectively.

The contents of the negative electrode active material, the conductive agent, and the binder in the negative electrode active material layer are respectively preferably 80% by weight to 98% by weight, 1% by weight to 10% by weight, and 1% by weight to 10% by weight, based on the weight of the negative electrode active material layer, and more preferably 90% by weight to 94% by weight, 2% by weight to 8% by weight, and 1% by weight to 5% by weight, based on the weight of the negative electrode active material layer.

(3) Separator

A separator is not limited particularly. For example, microporous membranes, woven fabrics, non-woven fabrics, laminate consisted of the same materials or different materials thereof, and the like can be used as the separator. Although examples of the material forming the separator may include polyethylene, polypropylene, ethylene-propylene copolymer, ethylene-butene copolymer, and cellulose, the material is not limited to those materials.

(4) Nonaqueous Electrolyte

A nonaqueous electrolyte may include, for example, a nonaqueous solvent and an electrolyte dissolved in the nonaqueous solvent.

The ion conductivity of the nonaqueous electrolyte is influenced by the type of nonaqueous solvent and the type and concentration of electrolyte, for example. When the nonaqueous solvent is a mixed solvent including two or more types of nonaqueous solvents, the ion conductivity of the nonaqueous electrolyte is also influenced by the mixing ratio of the nonaqueous solvent. The reason will be hereinafter described.

It can be said that a specific electrical conductivity of a solution is generally substantially proportional to a product of a concentration of ions in the solution and mobility of the ions in the solution.

If the amount of an electrolyte to be dissolved in a solvent increases, the concentration of ions produced through dissociation increases, and the ion conductivity increases. However, if the concentration of the electrolyte to be dissolved in the solvent is too high, all the electrolytes cannot be dissociated, and loss occurs in the actual ion concentration. In particular, as in a nonaqueous electrolyte for a nonaqueous electrolyte battery, when salt is dissolved at a high concentration of not less than 1 M, it is considered that the concentration does not reach the actual ion concentration.

On the other hand, the viscosity of the nonaqueous electrolyte increases accompanying an increase in the electrolyte concentration. If the concentration of the electrolyte is too high, it is considered that the mobility of ions is reduced. In a region where dissociation of the electrolyte satisfactorily progresses, since the reduction in mobility can be compensated for by an increase in ion concentration, enhancement of the ion conductivity can be expected. However, if the electrolyte concentration is too high, only the mobility is reduced without much increase in ion concentration, so that the ion conductivity is lowered.

The viscosity of the nonaqueous electrolyte also depends on the type of nonaqueous solvent, for example. In particular, when the nonaqueous solvent is a mixed solvent including two or more types of nonaqueous solvents, the viscosity of the nonaqueous electrolyte also depends on the mixing ratio of the nonaqueous solvent.

As the nonaqueous solvent, a cyclic carbonate and a linear carbonate may be used, for example.

For example, a cyclic carbonate such as ethylene carbonate and propylene carbonate has a high relative permittivity and can dissociate many Li ions from an electrolyte. Thus, the Li-ion concentration can be increased by using the cyclic carbonate. On the other hand, since a cyclic carbonate such as ethylene carbonate and propylene carbonate can exhibit high viscosity, the mobility of ions is reduced.

In contrast, a linear carbonate such as diethyl carbonate, ethylmethyl carbonate, and dimethyl carbonate has low relative permittivity and low viscosity, in contrast with the cyclic carbonate.

Accordingly, a nonaqueous solvent whose relative permittivity and viscosity are adjusted can be prepared by suitably mixing the cyclic carbonate and the linear carbonate.

The ion conductivity of the nonaqueous electrolyte depends on the type of electrolyte. As the electrolyte, lithium hexafluorophosphate ($LiPF_6$) may be used, for example.

As described above, the viscosity of the nonaqueous electrolyte and the Li-ion concentration also vary depending on the concentration of the electrolyte to be dissolved in a nonaqueous solvent.

For example, a nonaqueous electrolyte prepared as described in Example to be described below can exhibit ion conductivity at 25° C. in a range of not less than 7 mS/cm and not more than 10 mS/cm.

A nonaqueous electrolyte included in the nonaqueous electrolyte battery according to the first embodiment is not limited particularly as long as it has ion conductivity at 25° C. in the range of not less than 7 mS/cm and not more than 10 mS/cm.

For example, as the nonaqueous solvent, other nonaqueous solvents than the above-listed cyclic and linear carbonates may be used. Examples of usable nonaqueous solvents can include cyclic ethers such as tetrahydrofuran, 2-methyltetrahydrofuran, and dioxolane; chain ethers such as dimethoxyethane, diethoxyethane, and ethylene glycol dimethyl ether; carboxylic esters such as acetic esters and their derivatives, acetonitrile, and sulfolane.

As the electrolyte, other electrolytes than lithium hexafluorophosphate may be used. Examples of other electrolytes than lithium hexafluorophosphate can include lithium salts such as lithium perchlorate ($LiClO_4$), lithium tetrafluoroborate ($LiBF_4$), lithium hexafluoroarsenate ($LiAsF_6$), lithium trifluoromethanesulfonate ($LiCF_3SO_3$), bistrifluoromethyl sulfonylimide lithium ($LiN(CF_3SO_2)_2$), lithium bis(oxalato)borate (LiBOB), lithium hydrogen phosphite ($LiH_2PO_3$), dilithium hydrogen phosphite ($Li_2HPO_3$), lithium phosphate ($Li_2PO$), lithium difluorophosphate ($LiPO_2F_2$), lithium bisfluorosulfonylimide (LiFSI), and lithium bistrifluoromethylsulfonylimide and mixtures of them. The electrolyte preferably includes lithium hexafluorophosphate, and lithium hexafluorophosphate preferably constitutes not less than 90 mol % of the electrolyte.

The nonaqueous electrolyte may include any additive. Examples of additives can include vinylene carbonate (VC), fluorovinylene carbonate, methylvinylene carbonate, fluoromethylvinylene carbonate, ethylvinylene carbonate, propylvinylene carbonate, butylvinylene carbonate, dimethylvinylene carbonate, diethylvinylene carbonate, dipropylvinylene carbonate, vinylene acetate (VA), vinylene butyrate, vinylene hexanate, vinylene crotonate, catechol carbonate, propane sultone, and butanesultone. The additive can be dissolved in a nonaqueous solvent at a concentration of 5% or less, for example.

(5) Container Member

As a container member, although a metallic container or a laminate film container may be used, for example, the container member is not limited particularly.

By virtue of the use of a metallic container as the container member, a nonaqueous electrolyte battery excellent in impact resistance and long-term reliability can be achieved. By virtue of the use of a laminate film container as the container member, a nonaqueous electrolyte battery excellent in corrosion resistance can be achieved, and, at the same time, a nonaqueous electrolyte battery can be reduced in weight.

A metallic container having a wall thickness in a range of not less than 0.2 mm and not more than 1 mm may be used, for example. The wall thickness of the metallic container is more preferably 0.3 to 0.8 mm.

The metallic container preferably includes at least one selected from the group consisting of Fe, Ni, Cu, Sn, and Al. The metallic container may be formed of aluminum, aluminum alloy, or the like, for example. The aluminum alloy is preferably an alloy including elements such as magnesium, zinc, and silicon. When transition metals such as iron, copper, nickel, and chromium are contained in the alloy, the content of the transition metals is preferably not more than 1% by weight. According to this constitution, long-term reliability and heat dissipation under high temperature environment can be dramatically enhanced.

A laminate film container having a thickness within a range of not less than 0.1 mm and not more than 2 mm may be used, for example. A thickness of a laminate film is more preferably 0.2 mm or less.

As the laminated film, a multilayer film including a metal layer and a resin layer sandwiching the metal layer therebetween may be used. The metal layer preferably includes a metal including at least one selected from the group consisting of Fe, Ni, Cu, Sn, and Al. The metal layer is preferably an aluminum foil or an aluminum alloy foil for attaining a light weight. As the resin layer, a polymer material such as polypropylene (PP), polyethylene (PE), nylon, polyethylene terephthalate (PET), and the like may be used. The laminate film may be molded into the shape of the container member by sealing due to a thermal fusion bonding.

Examples of the shape of the container member can include a flat type (thin type), a rectangular type, a cylindrical type, a coin type, a button type and the like. The container member can adopt various dimensions in accordance with the application of the battery. For example, when the nonaqueous electrolyte battery according to the first embodiment is used for uses of mobile electronic devices, the container member can be made a small type adapted to the size of the electronic device into which the battery is to be installed. Alternatively, when the nonaqueous electrolyte battery is a nonaqueous electrolyte battery installed into a two-wheel or four-wheel automobile or the like, a container may be a large-battery container.

(6) Positive Electrode Current-Collecting Tab, Negative Electrode Current-Collecting Tab, Positive Electrode Terminal, and Negative Electrode Terminal It is desirable that a positive electrode current-collecting tab, a negative electrode current-collecting tab, a positive electrode terminal, and a negative electrode terminal are formed of aluminum or aluminum alloy, for example.

<Manufacturing Method>

The nonaqueous electrolyte battery according to the first embodiment can be manufactured by the following procedure, for example.

First, a positive electrode and a negative electrode are produced.

The positive electrode can be produced by the following method, for example. First, a positive electrode active material, a conductive agent, and a binder are dispersed into a suitable solvent to obtain a mixture. Subsequently, the obtained mixture is put into a stirrer. In this stirrer, the mixture is stirred to obtain a slurry. The slurry thus obtained is applied onto the positive electrode current collector, dried, and then pressed. Thus, the positive electrode can be produced.

The negative electrode can be produced by the following procedure, for example. First, a negative electrode active material, a conductive agent, and a binder are mixed. A mixture thus obtained is dispersed into a solvent to prepare a slurry. The slurry is applied onto a negative electrode current collector, dried, and then pressed. Thus, the negative electrode can be produced.

Here, the capacity p per unit area of the positive electrode and the thickness $T_p$ and the porosity of the positive electrode active material layer are significantly influenced by various factors such as the type of positive electrode active material, the mixing ratio of a conductive agent and/or a binder in the positive electrode active material layer, a coated amount of a slurry, and press conditions. Similarly, the capacity n per unit area of the negative electrode and the thickness $T_n$ and the porosity of the negative electrode active material layer are significantly influenced by the type of negative electrode active material, the mixing ratio of a conductive agent and/or a binder in the negative electrode active material layer, the coated amount of a slurry, press conditions, and so on, as in those of the positive electrode.

Therefore, because of the influence of the above-exemplified various factors, when a nonaqueous electrolyte battery is manufactured using a positive electrode including a lithium nickel cobalt manganese oxide and a negative electrode including a spinel type lithium titanate, only performing design such that the capacity ratio p/n between the positive electrode and the negative electrode is within a range of 1.4 to 1.8 cannot achieve a nonaqueous electrolyte battery which satisfies the thickness ratio $T_p/T_n$ within a range of not less than 1.03 and less than 1.15 and the porosity ratio $P_p/P_n$ within a range of not less than 0.6 and less than 0.8 in addition to the above capacity ratio p/n.

The nonaqueous electrolyte battery according to the first embodiment can be manufactured by adjusting production conditions of the positive electrode and production conditions of the negative electrode in combination, as described in the following Examples, for example.

Next, an electrode group is manufactured using the positive electrode and the negative electrode, each of which is thus obtained, and a separator. Next, the produced electrode group is housed in a container member. Next, the container member is sealed while leaving a portion thereof. Next, a nonaqueous electrolyte is put into the container member through the remaining unsealed portion of the container member. According to this constitution, the electrode group is impregnated with the nonaqueous electrolyte. Finally, an injection hole of the nonaqueous electrolyte is sealed, whereby the nonaqueous electrolyte battery can be obtained.

<Each Measuring Method>

Next, a method of calculating the capacity ratio p/n, the thickness of an electrode active material layer, and the porosity per 1 μm of the thickness of an electrode active material layer, each of which is to be performed on a nonaqueous electrolyte battery will be described.

First, a nonaqueous electrolyte battery to be tested is provided. The target nonaqueous electrolyte battery is a battery having a capacity of not less than 80% of a rated capacity. The capacity retention of the battery is judged by the following method. First, the battery is charged to a nominal cut-off charge voltage. A charging current value is a current value corresponding to a 1 C rate obtained from the rated capacity. After the voltage reaches the nominal cut-off charge voltage, the voltage is maintained for three hours. After the charge is performed and the voltage is maintained, the battery is discharged at the 1 C rate to a nominal cut-off discharge voltage. The above charge and discharge are performed in three cycles in total, and a discharge capacity obtained at the added third cycle is recorded. A ratio of the obtained discharge capacity to the rated capacity is defined as the capacity retention.

Next, in order to prevent the members of the battery from reacting with atmospheric components or moisture during disassembly, the battery is put in an inert gas atmosphere such as an inside of a glove box under an argon gas atmosphere. Next, the nonaqueous electrolyte battery is opened in such a glove box. For example, in the case of a laminate type nonaqueous electrolyte battery, the nonaqueous electrolyte battery can be cut open by cutting respective heat seal portions around a positive electrode current-collecting tab and a negative electrode current-collecting tab. The electrode group is taken out from the cut-opened nonaqueous electrolyte battery. When the taken-outed electrode group includes a positive electrode lead and a negative electrode lead, the positive electrode lead and the negative electrode lead are cut, taking care not to short-circuit the positive electrode and the negative electrode.

Next, the taken-out electrode group is disassembled to be separated into the positive electrode, the negative electrode, and the separator. After that, the weight of the positive electrode is measured. After that, the positive electrode is cut into square pieces of 3 cm, for example, to obtain a positive electrode sample. The state-of-charge of the battery may be any state.

Next, the weight of the positive electrode sample obtained by cutting the positive electrode is measured. After measurement, a two-electrode or three-electrode electrochemical measurement cell using the positive electrode sample as a working electrode and using lithium metal foil as a counter electrode and a reference electrode is produced. The produced electrochemical measurement cell is charged to a cut-off charge potential of 4.3 V (vs. Li/Li$^+$). After that, the voltage is maintained for three hours. The current value in this case is obtained by multiplying a ratio of the weight of the cut positive electrode sample to the weight of the positive electrode taken out from the battery by the rated capacity of the battery. After the charge is performed and the voltage is maintained, the battery is discharged to a cut-off discharge potential of 3.0 V (vs. Li/Li$^+$) at the same current value as charge. The above charge and discharge are performed in three cycles in total, and a discharge capacity obtained at the added third cycle is recorded. The capacity p per unit area of the positive electrode can be calculated by dividing the discharge capacity recorded here by the area of the positive electrode sample.

Next, the positive electrode sample is taken out from the electrochemical measurement cell and washed with a solvent. As the solvent, linear carbonates (such as dimethyl carbonate, ethylmethyl carbonate, and diethyl carbonate) or acetonitrile may be used. After the washing, a vacuum is produced while maintaining the inert gas atmosphere to dry the positive electrode sample. The positive electrode sample can be dried, for example, in a vacuum at 50° C. for 10 hours.

Subsequently, the thickness of the dried positive electrode sample is measured. In the measurement of the thickness, instruments such as micrometer and dial gauge may be used, or the thickness may be calculated from an electrode cross section observation image with the use of a laser microscope, a scanning electron microscope, or the like.

Next, in the positive electrode sample, a positive electrode active material layer is stripped from a positive electrode current collector. In this case, the positive electrode active material layer is stripped such that a surface of the positive electrode current collector is exposed. Next, the thickness of the positive electrode current collector remaining after the positive electrode active material layer is stripped is measured by a method similar to above.

A value obtained by subtracting the thickness of the positive electrode current collector from the electrode thickness, each of which is obtained as above, is taken as the thickness $T_p$ of the positive electrode active material layer. When electrode cross section observation is performed using a microscope or the like, each thickness of the positive electrode active material layer and the positive electrode current collector may be directly obtained in the stage. When the positive electrode active material layers are formed on both surfaces of the positive electrode current collector, a total of thicknesses of the two positive electrode active material layers is taken as the thickness $T_p$ of the positive electrode active material layer.

Next, a weight of a positive electrode active material layer sample stripped from the positive electrode current collector is measured. The weighed sample is introduced into a pore distribution measurement device, and the porosity is measured. As the pore distribution measurement device, ASAP 2020 manufactured by Shimadzu Corporation is used, for example, and a nitrogen gas is used as adsorption gas.

The porosity $P_p$ of the positive electrode active material layer per 1 μm of the thickness of the positive electrode active material layer is obtained by dividing the obtained porosity by the thickness $T_p$ of the positive electrode active material layer.

By the procedure similar to the above, with the use of the negative electrode taken out from the nonaqueous electrolyte battery by the above described procedures, the capacity n per unit area of the negative electrode, the thickness $T_n$ of the negative electrode active material layer, and the porosity $P_n$ per 1 μm of the thickness of the negative electrode active material layer can be measured. When the capacity n per unit area of the negative electrode is measured, the cut-off charge potential is set to 1.0 V (vs. Li/Li$^+$), and the cut-off discharge potential is set to 2.5 V (vs. Li/Li$^+$).

The capacity ratio p/n can be calculated by dividing the capacity p per unit area of the positive electrode by the capacity n per unit area of the negative electrode obtained as above.

Next, a method of measuring the ion conductivity of the nonaqueous electrolyte included in the nonaqueous electrolyte battery will be described.

First, following the above-described procedures, the nonaqueous electrolyte battery to be tested is provided and then disassembled. Next, the nonaqueous electrolyte is extracted from the disassembled battery. When the nonaqueous electrolyte is fully impregnated in an electrode group, a liquid electrolyte may be extracted using a method such as centrifugal separation. Those operations are performed in an environment in which moisture and oxygen have been removed. An inside of a glove box filled with argon gas or the like is preferable.

The ion conductivity of the obtained nonaqueous electrolyte is measured using a commercially available conductivity meter (for example, electrical conductivity meter CM-42X manufactured by DKK-TOA Corporation) or the like.

The conductivity meter measures the conductivity of ions in a solution to be measured. Accordingly, the electrical conductivity measured by the conductivity meter can be replaced with the ion conductivity.

When the amount of the nonaqueous electrolyte is small and thus a probe of a commercially available conductivity meter cannot be installed, metal plates having known electrode areas are arranged at constant intervals, and a Wheatstone bridge or the like is used to measure the ion conductivity.

Next, an example of the nonaqueous electrolyte battery according to the first embodiment will be described in more details with reference to FIGS. 1 to 5.

Figure 2:
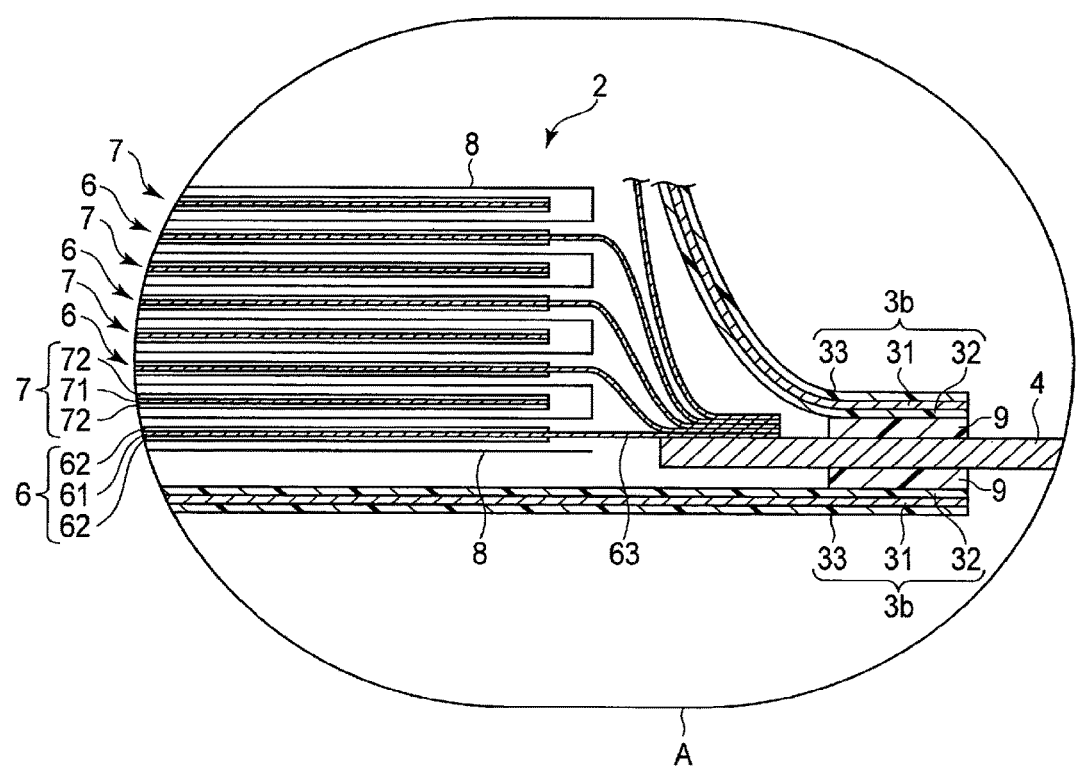
FIG. 2 is a schematic cross-sectional view of the A-portion shown in FIG. 1.

FIG. 1 is a schematic cut-away perspective view of an example of the nonaqueous electrolyte battery according to the first embodiment. FIG. 2 is a schematic cross-sectional view of the A-portion shown in FIG. 1. FIG. 3 is a schematic plane view of a positive electrode included in the nonaqueous electrolyte battery shown in FIG. 1. FIG. 4 is a schematic cross-sectional view along the line segment IV-IV of the positive electrode shown in FIG. 3. FIG. 5 is a schematic cross-sectional view of a negative electrode included in the nonaqueous electrolyte battery shown in FIG. 1.

A nonaqueous electrolyte battery 1 as a first example shown in FIGS. 1 to 5 includes an electrode group 2 shown in FIGS. 1 and 2, a container 3 shown in FIGS. 1 and 2, a positive electrode current-collecting tab 4 shown in FIGS. 1 and 2, and a negative electrode current-collecting tab 5 shown in FIG. 1.

The electrode group 2 shown in FIGS. 1 and 2 includes a plurality of positive electrodes 6, a plurality of negative electrodes 7, and a separator 8.

The positive electrode 6 includes, as shown in FIGS. 2 to 4, a positive electrode current collector 61 and positive electrode active material layers 62 formed on both surfaces of the positive electrode current collector 61. As shown in FIGS. 2 and 3, the positive electrode current collector 61 includes a portion 63 where the positive electrode active material layer 62 is not formed on the surface, and this portion 63 serves as a positive electrode lead. As shown in FIG. 3, the positive electrode lead 63 is a narrow portion narrower than the positive electrode active material layer 62. As shown in FIG. 4, the two positive electrode active material layers 62 have similar thicknesses $T_{p1}$ and $T_{p2}$, respectively. The thickness $T_p$ of the positive electrode active material layer 62 of the positive electrode 6 is represented by a sum $(T_{p1}+T_{p2})$.

The negative electrode 7 includes, as shown in FIGS. 2 and 5, a negative electrode current collector 71 and negative electrode active material layers 72 formed on both surfaces of the negative electrode current collector 71. Although not illustrated, the negative electrode current collector 71 includes a portion where the negative electrode active material layer 72 is not formed on the surface, and this portion serves as a negative electrode lead. As shown in FIG. 5, the two negative electrode active material layers 72 have similar thicknesses $T_{n1}$ and $T_{n2}$, respectively. The thickness $T_n$ of the negative electrode active material layer of the negative electrode 7 is represented by a sum $(T_{n1}+T_{n2})$.

As shown in FIG. 2, the separator 8 is folded into a zig-zag shape. Each of the positive electrode 6 or the negative electrode 7 is disposed in a space defined by facing surfaces of the separator 8 folded into the zig-zag shape, respectively. According to this constitution, as shown in FIG. 2, the positive electrodes 6 and the negative electrodes 7 are stacked such that the positive electrode active material layer 62 and the negative electrode active material layer 72 face each other while sandwiching the separator 8 therebetween. Thus, the electrode group 2 is formed.

The positive electrode leads 63 of the electrode group 2 extend from the electrode group 2, as shown in FIG. 2. As shown in FIG. 2, these positive electrode leads 63 are bundled together and connected to the positive electrode current-collecting tab 4. Although not illustrated, negative electrode leads of the electrode group 2 extend from the electrode group 2. Although not illustrated, these negative electrode leads are bundled together and connected to the negative electrode current-collecting tab 5 shown in FIG. 1.

The electrode group 2 is housed in the container 3, as shown in FIGS. 1 and 2.

The container 3 is formed of an aluminum-containing laminate film including an aluminum foil 31 and resin films 32 and 33 formed on both surfaces of the aluminum foil 31. The aluminum-containing laminate film forming the container 3 is folded at a folding portion 3d as a folding line such that the resin film 32 faces inside, and houses the electrode group 2. As shown in FIGS. 1 and 2, the container 3 sandwiches the positive electrode current-collecting tab 4 in between at its peripheral edge 3b. Similarly, the container 3 sandwiches the negative electrode current-collecting tab 5 in between at its peripheral edge 3c. According to this constitution, the positive electrode tab 4 and the negative electrode current-collecting tab 5 extend from the container 3 in directions opposite to each other.

In the container 3, the peripheral edges 3a, 3b, and 3c except for portions where the positive electrode current-collecting tab 4 or the negative electrode current-Collecting tab 5 are sandwiched are heat-sealed by thermal fusion of the resin films 32 facing each other.

In the nonaqueous electrolyte battery 1, in order to enhance binding strength between the positive electrode current-collecting tab 4 and the resin film 32, an insulating film 9 is provided between the positive electrode current-collecting tab 4 and the resin film 32, as shown in FIG. 2. At the peripheral edge 3b, the positive electrode tab 4 and the insulating film 9 are heat-sealed by thermal fusion, and the resin film 32 and the insulating film 9 are heat-sealed by thermal fusion. Similarly, although not illustrated, the insulating film 9 is provided between the negative electrode current-collecting tab 5 and the resin film 32. At the peripheral edge 3c, the negative electrode current-collecting tab 5 and the insulating film 9 are heat-sealed by thermal fusion, and the resin film 32 and the insulating film 9 are heat-sealed by thermal fusion. Namely, in the nonaqueous electrolyte battery 1 shown in FIGS. 1 to 3, all the peripheral edges 3a, 3b, and 3c of the container 3 are heat-sealed.

The container 3 further houses a nonaqueous electrolyte, which is not shown. The electrode group 2 is impregnated with the nonaqueous electrolyte.

Figure 6:
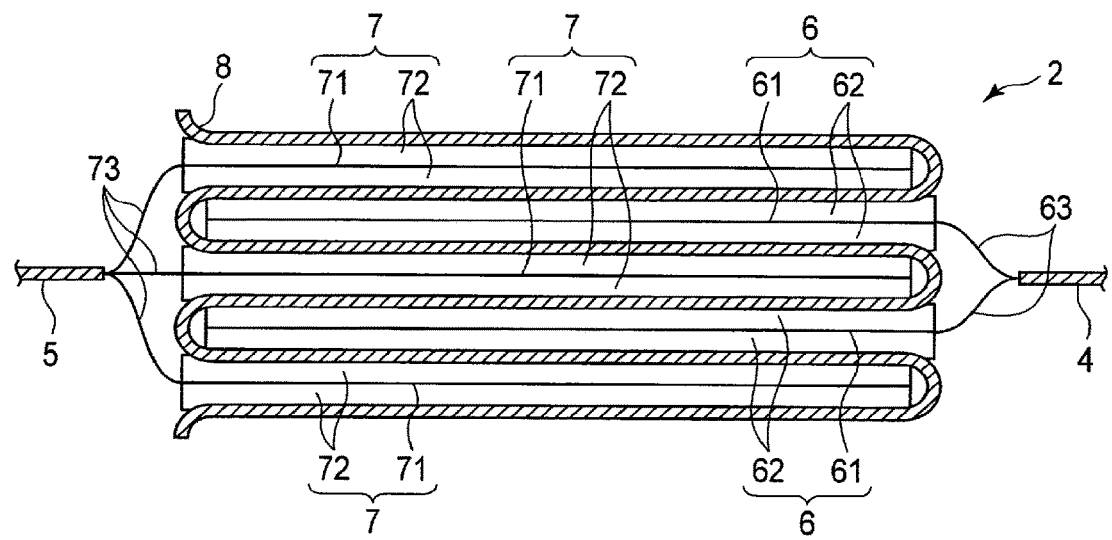
FIG. 6 is a schematic cross-sectional view of another example of an electrode group which can be included in the nonaqueous electrolyte battery according to the first embodiment.

In the nonaqueous electrolyte battery 1 shown in FIGS. 1 to 5, as shown in FIG. 2, the positive electrode leads 63 are bundled at the lowermost layer of the electrode group 2. Similarly, although not illustrated, the negative electrode leads are bundled at the lowermost layer of the electrode group 2. However, as shown in FIG. 6, for example, the positive electrode leads 63 and the negative electrode leads 73 are each bundled near a middle portion of the electrode group 2 and can be connected respectively to the positive electrode current-collecting tab 4 and the negative electrode current-collecting tab 5.

According to the first embodiment described above, there is provided a nonaqueous electrolyte battery including a positive electrode, a negative electrode, and a nonaqueous electrolyte. The positive electrode active material layer of the positive electrode includes a positive electrode active material of a lithium nickel cobalt manganese composite oxide. The negative electrode active material layer of the negative electrode includes a spinel type lithium titanate. The nonaqueous electrolyte has an ion conductivity of not less than 7 mS/cm and not more than 10 mS/cm at 25° C. In the nonaqueous electrolyte battery, a capacity ratio p/n is within a range of not less than 1.4 and not more than 1.8, the thickness ratio $T_p/T_n$ is within a range of not more than 1.05 and less than 1.3, and a porosity ratio $P_p/P_n$ is within a range of not less than 0.55 and less than 0.8. Due to these, the nonaqueous electrolyte battery according to the first embodiment can suppress oxidative degradation of the nonaqueous electrolyte, and further prevent occurrence of the bias of Li-ion concentration between the positive electrode and the negative electrode. As a result, the nonaqueous electrolyte battery according to the first embodiment can exhibit an excellent cycle life and excellent rate characteristics.

Second Embodiment

According to a second embodiment, a battery system is provided. The battery system includes a first battery unit and a second battery unit connected to the first battery unit in parallel. The first battery unit includes a lead-acid storage battery. The second battery unit includes the nonaqueous electrolyte battery according to the first embodiment.

As described above, the nonaqueous electrolyte battery according to the first embodiment can exhibit excellent rate characteristics. A first battery unit including a lead-acid storage battery and a second battery unit including the nonaqueous electrolyte battery according to the first embodiment are connected to each other in parallel. Thus, when a large current flows into a battery system according to the second embodiment, the second battery unit including the nonaqueous electrolyte battery according to the first embodiment can receive most of the large current. Consequently, a load on the first battery unit including a lead-acid storage battery can be reduced, so that degradation of the first battery unit can be prevented. In addition, the nonaqueous electrolyte battery according to the first embodiment can also exhibit excellent cycle life characteristics. As a result, the battery system according to the second embodiment can exhibit excellent cycle life characteristics and rate characteristics.

Next, the battery system according to the second embodiment will be described in more detail.

The first battery unit may include one lead-acid storage battery or lead-acid storage batteries. When the first battery unit includes lead-acid storage batteries, the lead-acid storage batteries can be electrically connected to each other in series, in parallel or in combination of them. Namely, the first battery unit may be a battery module including lead-acid storage batteries.

The second battery unit includes the nonaqueous electrolyte battery according to the first embodiment. The second battery unit may include one nonaqueous electrolyte battery or nonaqueous electrolyte batteries. When the second battery unit includes nonaqueous electrolyte batteries, at least one of them may be the nonaqueous electrolyte battery according to the first embodiment. When the second battery unit includes nonaqueous electrolyte batteries, the nonaqueous electrolyte batteries can be electrically connected to each other in series, in parallel or in combination of them. Namely, the second battery unit may be a battery module including nonaqueous electrolyte batteries.

The nonaqueous electrolyte battery according to the first embodiment can exhibit, for example, an operating voltage range of not more than 2.4 V, as described above. Among the nonaqueous electrolyte batteries according to the first embodiment, the nonaqueous electrolyte battery which can exhibit the operating voltage range of not more than 2.4 V can exhibit excellent voltage compatibility with a lead-acid storage battery.

Accordingly, among the battery systems according to the second embodiment, the battery system in which the nonaqueous electrolyte battery included in the second battery unit can exhibit the operating voltage range of not more than 2.4 V can be constituted even if there is no member for matching the voltage of the first battery unit and the voltage of the second battery unit, for example.

Next, an example of the battery systems according to the second embodiment will be specifically described with reference to the drawings.

Figure 7:
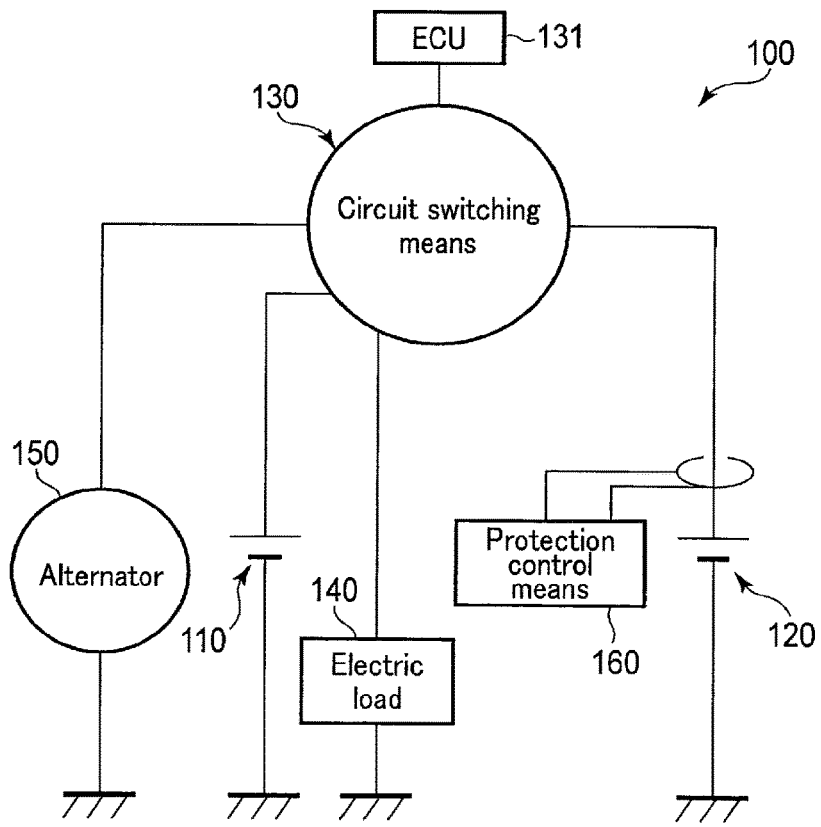
FIG. 7 is a schematic circuit diagram of an example of a battery system according to a second embodiment.

FIG. 7 is a schematic circuit diagram of a battery system according to the second embodiment.

A battery system 100 shown in FIG. 7 includes a first battery unit 110 and a second battery unit 120.

The first battery unit 110 is a battery module constituted of lead-acid storage batteries. The second battery unit 120 is a battery module constituted of the nonaqueous electrolyte batteries 1, each of which is described with reference to FIGS. 1 to 5. In the second battery unit 120, the nonaqueous electrolyte batteries 1 are connected to each other in series. A nominal voltage of the second battery unit 120 is similar to that of the first battery unit 110.

In the battery system 100 shown in FIG. 7, the first battery unit 110 and the second battery unit 120 are connected in parallel through circuit switching means 130.

The circuit switching means 130 includes a semiconductor switch (not shown). The semiconductor switch includes a metal-oxide-semiconductor junction field effect transistor (MOS-FET) and can switch between power-distribution and shutdown of electrons via the transistor. The switching between the power-distribution and the shut-down of electrons via the semiconductor switch is controlled by electric control means (ECU) 131.

The voltage between terminals of the first battery unit 110 is monitored by a sensor (not shown), and information thereof is sent to the electronic control means 131.

The battery system 100 shown in FIG. 7 further includes an electric load 140 and an alternator 150. The electric load 140 and the alternator 150 are connected in parallel to the first battery unit 110 and the second battery unit 120 via the circuit switching means 130.

The alternator 150 is an AC generator which converts mechanical energy into electric energy. The alternator 150 can send an AC current to a rectifier (not shown). The rectifier has a function of receiving an AC current and converting the received AC current into a DC current and passes the DC current to the battery system 100. The voltage sent from the alternator 150 is monitored by the sensor (not shown), and information thereof is sent to the electronic control means 131.

The battery system shown in FIG. 7 further includes a protection control means 160 configured to protect the first battery unit 110 and the second battery unit 120. The protection control means 160 may include, for example, means (not shown) monitoring the voltage between terminals of the second battery unit 120. For example, if the voltage between terminals of the second battery unit 120 deviates from a operatable voltage range of the first battery unit 110, the protection controlling means 160 can prevent power distribution between the first battery unit 110 and the second battery unit 120 by sending a signal to the electronic control means 131 connected to the circuit switching means 130 to make the semiconductor switch to a "shutdown" state.

The battery system 100 shown in FIG. 7 is, for example, a battery system for vehicles.

In the battery system 100 as a battery system for vehicles, the electric load 140 includes, for example, air-conditioning equipment and lighting equipment.

In the battery system 100 as a battery system for vehicles, the alternator 150 is mechanically connected to the engine of the vehicle. The alternator 150 is also connected to a braking system and can convert energy generated when the vehicle is braked into regenerated energy.

Next, an example of transmission of electric power in the battery system 100 as a battery system for vehicles will be described.

(1) During Operation of Engine

While the engine of the vehicle operates, the alternator 150 generates electric power, and electricity thus generated is converted into a DC current by a rectifier (not shown) and sent to the electric load 140.

If the transmission voltage from the alternator 150 is within a range permitted by the first battery unit 110 while the engine operates, the electronic control means 131 makes the state of the semiconductor switch to a "power distribution" state between the alternator 150 and the first battery unit 110 to send electricity generated by the alternator 150 to the first battery unit 110.

If the transmission voltage from the alternator 150 deviates from the range permitted by the first battery unit 110 while the engine operates, the electronic control means 131 makes the state of the semiconductor switch to the "shut-down" state between the alternator 150 and the first battery unit 110 to shut-down power transmission from the alternator 150 to the first battery unit 110.

Similarly, if the transmission voltage from the alternator 150 is within a range permitted by the second battery unit 120 while the engine operates, the electronic control means 131 makes the state of the semiconductor switch to the "power distribution" state between the alternator 150 and the second battery unit 120 to send electricity generated by the alternator 150 to the second battery unit 120.

If the transmission voltage from the alternator 150 deviates from the range permitted by the second battery unit 120 while the engine operates, the electronic control means 131 makes the state of the semiconductor switch to the "shut-down" state between the alternator 150 and the second battery unit 120 to block power transmission from the alternator 150 to the second battery unit 120.

If the transmission voltage from the alternator 150 is within a range permitted by both of the first battery unit 110 and the second battery unit 120 while the engine operates, electricity from the alternator 150 flows to both of the first battery unit 110 and the second battery unit 120. In this case, electricity preferentially flows to the battery unit having a lower resistance of the first battery unit 110 and the second battery unit 120, more specifically, to the second battery unit 120. Consequently, the electric load on the first battery unit 110 can be reduced.

(2) When Vehicle is Braked

When a vehicle is braked, the alternator 150 instantaneously applies a larger current to the battery system 100 than during the engine operates. In this case, while the electronic control means 131 makes the state of the semiconductor switch to the "power distribution" state between the alternator 150 and the second battery unit 120, the electronic control means 131 makes the state of the semiconductor switch to the "shut-down" state between the alternator 150 and the first battery unit 110.

In the battery system 100, the second battery unit 120 is a battery module of the nonaqueous electrolyte batteries 1 which can be rapidly charged and discharged. Thus, the second battery unit 120 can receive a large current generated by the alternator 150 when the vehicle is braked.

The lead-acid storage battery included in the first battery unit 110 tends to be degraded when electric energy at a large current is input. However, in the battery system 100, a large current input when the vehicle is braked can be received by, as described above, the second battery unit 120 including the nonaqueous electrolyte battery 1 capable of exhibiting excellent input characteristics. Therefore, the battery system 100 can efficiently regenerate energy obtained when braking and, at the same time, prevent degradation of the first battery unit 110 including a lead-acid storage battery and, furthermore, degradation of the entire battery system 100.

(3) When Engine Stops

When the engine stops, since the alternator 150 does not generate electric power, no electric power is transmitted from the alternator 150. Instead, the first battery unit 110 or the second battery unit 120 transmits electric power to the electric load 140. In this case, the protection control means 160 sends a signal to the electronic control means 131 to control the circuit switching means 130, so that the voltage of each of the first battery unit 110 and the second battery unit 120 can be maintained in an operatable voltage range.

The battery system according to the second embodiment includes the second battery unit including the nonaqueous electrolyte battery according to the first embodiment. Therefore, the battery system according to the second embodiment can exhibit an excellent cycle life and excellent rate characteristics.

EXAMPLES

Hereinafter, examples will be described.

Example 1

In Example 1, a nonaqueous electrolyte battery of Example 1 having a structure similar to that of the nonaqueous electrolyte battery 1 shown in FIGS. 1 to 5 was manufactured by the following procedures.

[Production of Positive Electrode]

As a positive electrode active material, a powder of lithium nickel cobalt manganese composite oxide ($LiNi_{0.5}Co_{0.3}Mn_{0.2}O_2$) was provided. A center particle size of particle size distribution of the positive electrode active material was 6.0 µm. As a conductive agent, acetylene black and graphite were provided. As a binding agent, polyvinylidene fluoride (PVdF) was provided. The lithium nickel cobalt manganese composite oxide powder, acetylene black, graphite, and PVdF, which were provided, were added to N-methylpyrrolidone in a weight ratio of 87% by weight: 5.0% by weight:3.0% by weight:5.0% by weight and mixed. Thus, a positive electrode slurry was prepared.

Next, the positive electrode slurry obtained after stirring was coated onto both surfaces of an aluminum foil having a thickness of 15 µm by a coater. In this case, a portion coated with no slurry was left on the aluminum foil. Next, an obtained coating was dried. Next, the dried coating was rolled by a roll press machine such that a thickness of a positive electrode was 47 µm and the density of a positive electrode active material layer was 3.0 g/cm³. Finally, the portion coated with no slurry was punched to form a narrow portion as a positive electrode lead as shown in FIG. 3. Thus, positive electrodes were produced.

[Production of Negative Electrode]

As a negative electrode active material, a powder of spinel type lithium titanate ($Li_4Ti_5O_{12}$) was provided. The center particle size of the particle size distribution of the negative electrode active material was 1.0 µm. As a conductive agent, acetylene black and graphite were provided. As a binding agent, polyvinylidene fluoride (PVdF) was provided. The lithium titanate, acetylene black, graphite, and PVdF, which were provided, were added to N-methylpyrrolidone in a weight ratio of 91% by weight:3.0% by weight:3.0% by weight:3.0% by weight and mixed. Thus, a negative electrode slurry was prepared.

Next, the negative electrode slurry obtained after stirring was coated onto both surfaces of an aluminum foil having a thickness of 15 µm by a coater. In this case, a portion coated with no slurry was left on the aluminum foil. Next, an obtained coating was dried. Next, the dried coating was rolled by a roll press machine such that a thickness of a negative electrode was 44 µm and the density of a negative electrode active material layer was 2.1 g/cm³. Finally, the portion coated with no slurry was punched to form a narrow portion as a negative electrode lead. Thus, a plurality of negative electrodes were produced.

The ratio $T_p/T_n$ of the thickness $T_p$ of the positive electrode active material layer of the produced positive electrode to the thickness $T_n$ of the negative electrode active material layer was 1.11.

[Production of Electrode Group]

First, a belt-like microporous membrane separator having a thickness of 30 µm was provided. Next, this separator was folded into a zig-zag shape. Next, as described above with reference to FIG. 2, the positive electrode and the negative electrode were inserted into a space, defined by facing surfaces of the separator folded into a zig-zag shape, so that one positive electrode and one negative electrode face each other with the separator provided in between. In this case, positive electrode leads and negative electrode leads were extended from the stack in opposite directions to each other. Finally, a winding stopper tape (not shown) was applied to the obtained stack, thus forming an electrode group. The electrode area and the number of stacked elements were adjusted such that the discharge capacity of the electrode group was 0.5 Ah.

[Connection of Positive Electrode Current-Collecting Tab and Negative Electrode Current-Collecting Tab to Electrode Group]

A positive electrode current-collecting tab and a negative electrode current-collecting tab were produced using aluminum. Subsequently, positive electrode leads of positive electrodes were bundled to be connected to the positive electrode current-collecting tab. Similarly, negative electrode leads of negative electrodes were bundled to be connected to the negative electrode current-collecting tab. Thus, the positive electrode tab and the negative electrode tab were installed to be extended from the electrode group in the directions opposite to each other so that current collection from the positive electrode or the negative electrode could be simply performed.

[Production of Container]

As a container, an aluminum-containing laminate film was used. The used aluminum-containing laminate film had a structure similar to that of the container 3 shown in FIG. 2. Specifically, the used aluminum-containing laminate film was constituted of an aluminum foil and two resin films sandwiching the aluminum foil therebetween.

The aluminum-containing laminate film was formed into a shape being able to accommodate the electrode group. As described above with reference to FIGS. 1 and 2, the electrode group was housed in the aluminum-containing laminate film thus formed. In this case, as shown in FIG. 2, at one peripheral edge of the container, the positive electrode current-collecting tab was sandwiched between resin films facing each other. Similarly, at another peripheral edge of the container, the negative electrode current-collecting tab was sandwiched between resin films facing each other. Insulating films were provided between the positive electrode current-collecting tab and the resin film and between the positive electrode current-collecting tab and the resin film.

Subsequently, the resin films facing at three peripheral edges were thermally fused and fixed while leaving a portion as an opening portion. At the same time, the resin film and the insulating film facing the resin film were thermally fused and fixed at the peripheral edge sandwiching the positive electrode tab, and the positive electrode tab and the insulating film facing the positive electrode tab were thermally fused and bonded to each other. Similarly, the resin film and the insulating film facing the resin film were thermally fused and bonded to each other at the peripheral edge sandwiching the negative electrode current-collecting tab, and the negative electrode current-collecting tab and the insulating film facing the negative electrode current-collecting tab were thermally fused and bonded to each other. Thus, a cell before-injection was produced.

[Injection of Nonaqueous Electrolyte]

Ethylene carbonate and ethylmethyl carbonate were mixed at a volume ratio of 3:7 to prepare a nonaqueous solvent. Lithium hexafluorophosphate was dissolved as an electrolyte at a concentration of 1 mol/l in the nonaqueous solvent. Thus, a nonaqueous electrolyte was prepared. In the prepared nonaqueous electrolyte, the ion conductivity at 25° C. was 7.58 mS/cm.

The nonaqueous electrolyte was injected into the above described cell before-injection. The nonaqueous electrolyte was injected via an opening of the peripheral edge of the container, which has been left without being thermally fused.

[Manufacturing of Nonaqueous Electrolyte Battery]

At the opening of the peripheral edge of the container, which has been left without being thermally fused, the resin films facing each other were thermally fused. Thus, the nonaqueous electrolyte battery of Example 1 was obtained.

[Evaluation]

For the nonaqueous electrolyte battery of Example 1 manufactured as above, resistance values before and after the charge-and-discharge cycle, the rate characteristics, and charge-and-discharge cycle characteristics were evaluated by the following procedures.

(Measurement of Resistance Value Before Charge-and-Discharge Cycle)

The nonaqueous electrolyte battery of Example 1 was charged at a constant current of 0.5 A in a thermostatic chamber maintained at 25° C. until the voltage reached 2.4 V. Subsequently, the voltage of the nonaqueous electrolyte battery was maintained at 2.4 V for three hours as it is. After that, the nonaqueous electrolyte battery of Example 1 was allowed to stand in an open circuit state for 30 minutes. Next, the nonaqueous electrolyte battery of Example 1 was discharged at a constant current of 0.5 A until the voltage reached 1.4 V. One cycle including the constant-current charge, the standing in the open circuit state, and the constant-current discharge each described above was taken as one charge-and-discharge cycle. This charge-and-discharge cycle was repeated three times on the nonaqueous electrolyte battery of Example 1. The capacity obtained during discharge at the third cycle was taken as a reference capacity. The reference capacity of the nonaqueous electrolyte battery of Example 1 was 0.5 Ah.

After that, the nonaqueous electrolyte battery of Example 1 was charged to a state-of-charge of 50% with respect to the reference capacity. After that, the nonaqueous electrolyte battery of Example 1 was discharged in a 25° C. environment. The discharge here was performed at a rate of 10 C for 10 seconds.

The resistance in this case was measured as follows. First, the voltage before current application was set to $V_0$. On the other hand, the voltage obtained when discharge was performed for 10 seconds was set to $V_{10}$. A value of the voltage $V_0$, a value of the voltage $V_{10}$, and a value of a current value $I_{10C}$ corresponding to 10 C rate were substituted respectively for $V_0$, $V_{10}$, and $I_{10C}$ of the following formula (1), and a 10-second resistance $R_{10sec}$ was calculated.

$$R_{10sec} = |V_{10} - V_0|/I_{10C} \quad (1)$$

The 10-second resistance $R_{10sec}$ thus calculated was taken as a resistance value $R_s$ before the cycles. $R_s$ was 30 mΩ.

(Rate Characteristics Test)

The nonaqueous electrolyte battery of Example 1 was charged in a thermostatic chamber maintained at 25° C. at a constant current of 0.5 A until the voltage reached 2.4 V. Subsequently, the voltage of the nonaqueous electrolyte battery was maintained at 2.4 V for three hours as it is. After that, the nonaqueous electrolyte battery was allowed to stand in an open circuit state for 30 minutes. Subsequently, the nonaqueous electrolyte battery was discharged at a constant current of 5.0 A until the voltage reached 1.4 V. A value obtained by dividing the discharge capacity in this discharge operation by the reference capacity was taken as rate capacity retention.

(Charge-and-Discharge Cycle Characteristics Test)

The charge-and-discharge cycle was repeated 500 times in a 45° C. environment on the nonaqueous electrolyte battery of Example 1. Specifically, a charge-and-discharge cycle test was conducted by the following procedures. First, the nonaqueous electrolyte battery of Example 1 was discharged at a constant current of 2.5 A until the voltage reached 2.4 V. Subsequently, the nonaqueous electrolyte battery of Example 1 was subjected to constant-voltage charge in such a state that the voltage was maintained at 2.4 V, and charge was stopped once a current value reached 0.25 A. Next, the nonaqueous electrolyte battery of Example 1 was allowed to stand in an open circuit state for 10 minutes. Next, the nonaqueous electrolyte battery of Example 1 was discharged at a constant current of 2.5 A until the voltage reached 1.4 V. One cycle including the constant-current charge, the constant-voltage charge, the standing in the open circuit, and the constant-current discharge each described above was taken as one charge-and-discharge cycle. This charge-and-discharge cycle was repeated 500 times on the nonaqueous electrolyte battery of Example 1.

After the charge-and-discharge cycle was performed 500 times, the nonaqueous electrolyte battery of Example 1 was subjected to three additional charge-and-discharge cycles by the following procedures. First, the nonaqueous electrolyte battery of Example 1 was charged in a thermostatic chamber maintained at 25° C. at a constant current of 0.5 A until the voltage reached 2.4 V. Subsequently, the voltage of the nonaqueous electrolyte battery was maintained at 2.4 V for three hours as it is. After that, the nonaqueous electrolyte battery of Example 1 was allowed to stand in an open circuit state for 30 minutes. Subsequently, the nonaqueous electrolyte battery of Example 1 was discharged at a constant current of 0.5 A until the voltage reached 1.4 V. One cycle including the constant-current charge, the constant-voltage keep holding, the standing in the open circuit, and the constant-current discharge each described above was taken as one additional charge-and-discharge cycle. This additional charge-and-discharge cycle was repeated three times. A ratio of the capacity obtained during discharge in a third additional charge-and-discharge cycle to the reference capacity was taken as capacity retention on cycles. The capacity retention on cycles of the nonaqueous electrolyte battery of Example 1 was 95%.

(Measurement of Resistance Value after Charge-and-Discharge Cycles)

The nonaqueous electrolyte battery of Example 1 in which the charge-and-discharge cycle characteristics had been evaluated was charged such that the capacity was 50% of the discharge capacity obtained during discharge in the third additional charge-and-discharge cycle. The 10-second resistance $R_{10sec}$ of the nonaqueous electrolyte battery of Example 1 in that state was calculated using the above formula (1) by procedures similar to those in the measurement of the resistance value before the charge-and-discharge cycle. The 10-second resistance $R_{10sec}$ thus calculated was taken as a resistance value $R_f$ after the cycle.

(Calculation of Resistance Increase Ratio T)

The value of the resistance value $R_s$ before the cycle of the nonaqueous electrolyte battery of Example 1 and the value of the resistance value $R_f$ after the cycle were substituted respectively for $R_s$ and $R_f$ in the following formula (2), and a resistance increase ratio T between before and after the cycle was calculated.

$$T = (R_f - R_s)/R_s \quad (2)$$

[Measurement of Capacity and Porosity of Positive Electrode]

For the nonaqueous electrolyte battery of Example 1 after measurement of the resistance increase ratio, a positive electrode capacity was measured by the following procedures. Details of a method of disassembling the nonaqueous electrolyte battery are as follows.

First, the nonaqueous electrolyte battery of Example 1 was put into a glove box in an argon atmosphere. Subsequently, the nonaqueous electrolyte battery was disassembled. An electrode group was taken out from the disassembled nonaqueous electrolyte battery. A positive electrode and a negative electrode were taken out from the taken-out electrode group.

Subsequently, the weight of the taken-out positive electrode was measured. Next, a piece having a size of 2 cm×2 cm was cut out from the positive electrode and used as a positive electrode sample. The weight of the positive electrode sample was measured. Subsequently, the positive electrode sample was disposed as a working electrode in a glass cell, and lithium metal was disposed as a counter electrode. A belt-like microporous membrane separator having a thickness of 30 μm was provided between those electrodes. As a nonaqueous electrolyte, a nonaqueous electrolyte obtained by mixing ethylene carbonate and dimethyl carbonate at a ratio of 1:1 was used as a nonaqueous solvent, and a liquid nonaqueous electrolyte using 1 mol/l of lithium hexafluorophosphate as an electrolyte was prepared. The nonaqueous electrolytic solution was poured into the glass cell, and a beaker cell was produced.

The beaker cell was charged at a constant current of 0.3 mA until the potential of the positive electrode sample as the working electrode reached 4.3 V (vs. Li/Li$^+$). After that, the voltage of the beaker cell was maintained at 4.3 V for three hours. Subsequently, the beaker cell was allowed to stand in the open circuit state for 30 minutes. Subsequently, the beaker cell was discharged at a constant current of 0.3 mA until the potential of the positive electrode sample reached 3.5 V (vs. Li/Li$^+$). The discharge capacity in this case was recorded as the capacity of the positive electrode sample. A value obtained by dividing this discharge capacity by 4 cm$^2$ as an electrode area was taken as the capacity p per unit area of the positive electrode.

After measurement of the capacity, the beaker cell was disassembled to take out the positive electrode sample. The porosity of the positive electrode active material layer was measured using this positive electrode sample in accordance with the above described procedures. The porosity of the positive electrode active material layer of the nonaqueous electrolyte battery of Example 1 was 32%.

[Measurement of Capacity and Porosity of Negative Electrode]

The weight of the negative electrode taken out from the nonaqueous electrolyte battery disassembled by the above procedure was measured. A piece having a size of 2 cm×2 cm was cut out from the negative electrode and used as a negative electrode sample. The weight of the negative electrode sample was measured. Subsequently, a beaker cell for the negative electrode was produced using this negative electrode sample by procedures similar to those in the production of the beaker cell for the positive electrode.

The beaker cell was charged at a constant current of 0.3 mA until the potential of the negative electrode sample as a working electrode reached 1.0 V (vs. Li/Li$^+$). After that, the voltage of the beaker cell was maintained at 1.0 V for three hours. Subsequently, the beaker cell was allowed to stand in the open circuit state for 30 minutes. Subsequently, the beaker cell was discharged at a constant current of 0.3 mA until the potential of the negative electrode sample reached 2.5 V (vs. Li/Li$^+$). The discharge capacity in this case was recorded as the capacity of the negative electrode sample. A value obtained by dividing this capacity by 4 cm$^2$ as an electrode area was taken as the capacity n per unit area of the negative electrode.

After measurement of the capacity, the beaker cell was disassembled to take out the negative electrode sample. The porosity of the negative electrode active material layer was measured using this negative electrode sample in accordance with the above described procedures. The porosity of the negative electrode active material layer of the nonaqueous electrolyte battery of Example 1 was 38%.

(Calculation of Capacity Ratio p/n and Porosity Ratio $P_p/P_n$)

The capacity ratio p/n was calculated by dividing the capacity p per unit area of the positive electrode measured as above by the capacity per unit area of the negative electrode similarly measured as above. The capacity ratio p/n of the nonaqueous electrolyte battery of Example 1 was 1.4.

The porosity $P_p$ of the positive electrode active material layer per 1 μm of the thickness of the positive electrode active material layer was calculated by dividing the porosity of the positive electrode active material layer by the thickness $T_p$ of the positive electrode active material layer. Similarly, the porosity $P_n$ of the negative electrode active material per 1 μm of the thickness of the negative electrode active material layer was calculated by dividing the porosity of the negative electrode active material layer by the thickness $T_n$ of the negative electrode active material layer. The porosity ratio $P_p/P_n$ was calculated using the porosity per 1 μm of the thickness of each electrode active material layer thus calculated. The porosity ratio $P_p/P_n$ of the nonaqueous electrolyte battery of Example 1 was 0.762.

Example 2

In Example 2, a nonaqueous electrolyte battery of Example 2 was manufactured by procedures similar to those in Example 1 except for the following points.

First, in Example 2, positive electrodes were produced as in Example 1, except that a coated amount of a positive electrode slurry and rolling conditions in a roll press machine were changed such that the thickness of a positive electrode after rolling was 50 μm and the density of a positive electrode active material layer was 3.0 g/cm$^3$.

Further, in Example 2, negative electrodes were produced as in Example 1, except that a coated amount of a negative electrode slurry and rolling conditions in a roll press machine were changed such that the thickness of a negative electrode after rolling was 46 μm and the density of a negative electrode active material layer was 2.0 g/cm$^3$.

In Example 2, the nonaqueous electrolyte battery of Example 2 exhibiting a capacity similar to that in the nonaqueous electrolyte battery of Example 1 was manufactured by adjusting the number of positive electrodes to be used, the number of negative electrodes to be used, an area of the positive electrode active material layer, and an area of the negative electrode active material layer.

Example 3

In Example 3, a nonaqueous electrolyte battery of Example 3 was manufactured by procedures similar to those in Example 1 except for the following points.

First, in Example 3, positive electrodes were produced as in Example 1, except that a coated amount of a positive electrode slurry and rolling conditions in a roll press machine were changed such that the thickness of a positive electrode after rolling was 54 μm and the density of a positive electrode active material layer was 2.9 g/cm$^3$.

In Example 3, negative electrodes were produced as in Example 1, except that a coated amount of a negative electrode slurry and rolling conditions in a roll press machine were changed such that the thickness of a negative electrode after rolling was 46 μm and the density of a negative electrode active material layer was 2.0 g/cm$^3$.

In Example 3, the nonaqueous electrolyte battery of Example 3 exhibiting a capacity similar to that in the nonaqueous electrolyte battery of Example 1 was manufactured by adjusting the number of positive electrodes to be used, the number of negative electrodes to be used, an area of the positive electrode active material layer, and an area of the negative electrode active material layer.

Example 4

In Example 4, a nonaqueous electrolyte battery of Example 4 was manufactured by procedures similar to those in Example 1 except for the following points.

First, in Example 4, positive electrodes were produced as in Example 1, except that a coated amount of a positive electrode slurry and rolling conditions in a roll press machine were changed such that the thickness of a positive electrode after rolling was 63 μm and the density of a positive electrode active material layer was 2.7 g/cm$^3$.

In Example 4, negative electrodes were produced as in Example 1, except that a coated amount of a negative electrode slurry and rolling conditions in a roll press machine were changed such that the thickness of a negative electrode after rolling was 53 μm and the density of a negative electrode active material layer was 1.8 g/cm$^3$.

In Example 4, the nonaqueous electrolyte battery of Example 4 exhibiting a capacity similar to that in the nonaqueous electrolyte battery of Example 1 was manufactured by adjusting the number of positive electrodes to be used, the number of negative electrodes to be used, an area of the positive electrode active material layer, and an area of the negative electrode active material layer.

Example 5

In Example 5, a nonaqueous electrolyte battery of Example 5 was manufactured by procedures similar to those in Example 1 except for the following points.

First, in Example 5, positive electrodes were produced as in Example 1; except that a coated amount of a positive electrode slurry and rolling conditions in a roll press machine were changed such that the thickness of a positive electrode after rolling was 51 μm and the density of a positive electrode active material layer was 2.9 g/cm$^3$.

In Example 5, negative electrodes were produced as in Example 1, except that a coated amount of a negative electrode slurry and rolling conditions in a roll press machine were changed such that the thickness of a negative electrode after rolling was 46 μm and the density of a negative electrode active material layer was 2.0 g/cm$^3$.

In Example 5, the nonaqueous electrolyte battery of Example 5 exhibiting a capacity similar to that in the nonaqueous electrolyte battery of Example 1 was manufactured by adjusting the number of positive electrodes to be used, the number of negative electrodes to be used, an area of the positive electrode active material layer, and an area of the negative electrode active material layer.

Example 6

In Example 6, a nonaqueous electrolyte battery of Example 6 was manufactured by procedures similar to those in Example 1 except for the following points.

First, in Example 6, a plurality of positive electrodes were produced as in Example 1, except that a coated amount of a positive electrode slurry and rolling conditions in a roll press machine were changed such that the thickness of a positive electrode after rolling was 51 μm and the density of a positive electrode active material layer was 2.8 g/cm$^3$.

In Example 6, negative electrodes were produced as in Example 1, except that a coated amount of a negative electrode slurry and rolling conditions in a roll press machine were changed such that the thickness of a negative electrode after rolling was 46 μm and the density of a negative electrode active material layer was 2.0 g/cm$^3$.

In Example 6, the nonaqueous electrolyte battery exhibiting a capacity similar to that in the nonaqueous electrolyte battery of Example 1 was manufactured by adjusting the number of positive electrodes to be used, the number of negative electrodes to be used, an area of the positive electrode active material layer, and an area of the negative electrode active material layer.

Example 7

In Example 7, a nonaqueous electrolyte battery of Example 7 was manufactured by procedures similar to those in Example 1 except for the following points.

First, in Example 7, positive electrodes were produced as in Example 1; except that a coated amount of a positive electrode slurry and rolling conditions in a roll press machine were changed such that the thickness of a positive electrode after rolling was 53 μm and the density of a positive electrode active material layer was 2.8 g/cm$^3$.

In Example 7, a plurality of negative electrodes were produced as in Example 1, except that a coated amount of a negative electrode slurry and rolling conditions in a roll press machine were changed such that the thickness of a negative electrode after rolling was 46 μm and the density of a negative electrode active material layer was 2.0 g/cm$^3$.

In Example 7, the nonaqueous electrolyte battery of Example 7 exhibiting a capacity similar to that in the nonaqueous electrolyte battery of Example 1 was manufactured by adjusting the number of positive electrodes to be used, the number of negative electrodes to be used, an area of the positive electrode active material layer, and an area of the negative electrode active material layer.

Example 8

In Example 8, a nonaqueous electrolyte battery of Example 8 was manufactured by procedures similar to those in Example 1 except for the following points.

First, in Example 8, positive electrodes were produced as in Example 1, except that a coated amount of a positive electrode slurry and rolling conditions in a roll press machine were changed such that the thickness of a positive electrode after rolling was 48 μm and the density of a positive electrode active material layer was 3.2 g/cm$^3$.

In Example 8, negative electrodes were produced as in Example 1; except that a coated amount of a negative electrode slurry and rolling conditions in a roll press machine were changed such that the thickness of a negative electrode after rolling was 46 μm and the density of a negative electrode active material layer was 2.2 g/cm$^3$.

In Example 8, the nonaqueous electrolyte battery of Example 8 exhibiting a capacity similar to that in the nonaqueous electrolyte battery of Example 1 was manufactured by adjusting the number of positive electrodes to be used, the number of negative electrodes to be used, an area of the positive electrode active material layer, and an area of the negative electrode active material layer.

Example 9

In Example 9, a nonaqueous electrolyte battery of Example 9 was manufactured by procedures similar to those in Example 1 except that a nonaqueous electrolyte prepared by the following procedures was used instead of the nonaqueous electrolyte used in Example 1.

First, ethylene carbonate, ethylmethyl carbonate, and dimethyl carbonate were mixed at a volume ratio of 3:3:4 to prepare a nonaqueous solvent. Next, lithium hexafluorophosphate as an electrolyte was dissolved at a concentration of 1 mol/l in the nonaqueous solvent, thus obtaining a nonaqueous electrolyte. In the prepared nonaqueous electrolyte, the ion conductivity at 25° C. was 8.12 mS/cm.

Example 10

In Example 10, a nonaqueous electrolyte battery of Example 10 was manufactured by procedures similar to those in Example 1 except that a nonaqueous electrolyte prepared by the following procedures was used instead of the nonaqueous electrolyte used in Example 1.

First, ethylene carbonate and dimethyl carbonate were mixed at a volume ratio of 3:7 to prepare a nonaqueous solvent. Next, lithium hexafluorophosphate was dissolved as an electrolyte at a concentration of 1 mol/l in the nonaqueous solvent, thus obtaining a nonaqueous electrolyte. In the prepared nonaqueous electrolyte, the ion conductivity at 25° C. was 8.69 mS/cm.

Example 11

In Example 11, a nonaqueous electrolyte battery of Example 11 was manufactured by procedures similar to those in Example 1 except that a positive electrode was produced as described hereinafter.

First, in Example 11, as a positive electrode active material, a powder of lithium nickel cobalt manganese composite oxide ($LiNi_{0.5}Co_{0.2}Mn_{0.3}O_2$) was provided. As in Example 1, acetylene black and graphite as conductive agents and polyvinylidene fluoride (PVdF) as a binder were provided. The lithium nickel cobalt manganese composite oxide powder, acetylene black, graphite, and PVdF, which were provided, were added to N-methylpyrrolidone in a weight ratio of 87% by weight:5.0% by weight:3.0% by weight:5.0% by weight and mixed. Thus, a positive electrode slurry was prepared.

Next, the positive electrode slurry obtained after stirring was coated onto both surfaces of an aluminum foil having a thickness of 15 μm by a coater. In this case, a portion coated with no slurry was left on the aluminum foil. Next, an obtained coating was dried. Next, the dried coating was rolled by a roll press machine such that a thickness of a positive electrode was 46 μm and the density of a positive electrode active material layer was 3.0 g/cm³. Finally, the portion coated with no slurry was punched to form a narrow portion as a positive electrode lead as shown in FIG. 3. Thus, positive electrodes were produced.

Example 12

In Example 12, a nonaqueous electrolyte battery of Example 12 was manufactured by procedures similar to those in Example 1 except that a positive electrode was produced as described hereinafter.

First, in Example 12, as a positive electrode active material, a powder of lithium nickel cobalt manganese composite oxide ($LiNi_{0.33}Co_{0.33}Mn_{0.33}O_2$) was provided. A center particle size of particle size distribution of the positive electrode active material was 6.0 μm. As in Example 1, acetylene black and graphite as conductive agents and polyvinylidene fluoride (PVdF) as a binder were provided. The lithium nickel cobalt manganese composite oxide powder, acetylene black, graphite, and PVdF, which were provided, were added to N-methylpyrrolidone in a weight ratio of 87% by weight:5.0% by weight:3.0% by weight:5.0% by weight and mixed. Thus, a positive electrode slurry was prepared.

Next, the positive electrode slurry obtained after stirring was coated onto both surfaces of an aluminum foil having a thickness of 15 μm by a coater. In this case, a portion coated with no slurry was left on the aluminum foil. Next, an obtained coating was dried. Next, the dried coating was rolled by a roll press machine such that a thickness of a positive electrode was 50 μm and the density of a positive electrode active material layer was 3.0 g/cm³. Finally, the portion coated with no slurry was punched to form a narrow portion as a positive electrode lead as shown in FIG. 3. Thus, positive electrodes were produced.

Comparative Example 1

In Comparative Example 1, a nonaqueous electrolyte battery of Comparative Example 1 was manufactured by procedures similar to those in Example 1 except for the following points.

First, in Comparative Example 1, positive electrodes were produced as in Example 1, except that a coated amount of a positive electrode slurry and rolling conditions in a roll press machine were changed such that the thickness of a positive electrode after rolling was 34 μm and the density of a positive electrode active material layer was 3.4 g/cm³.

In Comparative Example 1, negative electrodes were produced as in Example 1; except that a coated amount of a negative electrode slurry and rolling conditions in a roll press machine were changed such that the thickness of a negative electrode after rolling was 50 μm and the density of a negative electrode active material layer was 1.8 g/cm³.

In Comparative Example 1, the nonaqueous electrolyte battery of Comparative Example 1 exhibiting a capacity similar to that in the nonaqueous electrolyte battery of Example 1 was manufactured by adjusting the number of positive electrodes to be used, the number of negative electrodes to be used, an area of the positive electrode active material layer, and an area of the negative electrode active material layer.

Comparative Example 2

In Comparative Example 2, a nonaqueous electrolyte battery of Comparative Example 2 was manufactured by procedures similar to those in Example 1 except for the following points.

First, in Comparative Example 2, positive electrodes were produced as in Example 1; except that a coated amount of a positive electrode slurry and rolling conditions in a roll press machine were changed such that the thickness of a positive electrode after rolling was 43 μm and the density of a positive electrode active material layer was 2.6 g/cm³.

In Comparative Example 2, a plurality of negative electrodes were produced as in Example 1, except that a coated amount of a negative electrode slurry and rolling conditions in a roll press machine were changed such that the thickness of a negative electrode after rolling was 42 μm and the density of a negative electrode active material layer was 2.3 g/cm³.

In Comparative Example 2, the nonaqueous electrolyte battery of Comparative Example 2 exhibiting a capacity similar to that in the nonaqueous electrolyte battery of Example 1 was manufactured by adjusting the number of positive electrodes to be used, the number of negative electrodes to be used, an area of the positive electrode active material layer, and an area of the negative electrode active material layer.

Comparative Example 3

In Comparative Example 3, a nonaqueous electrolyte battery of Comparative Example 3 was manufactured by procedures similar to those in Example 1 except for the following points.

First, in Comparative Example 3, a plurality of positive electrodes were produced as in Example 1, except that a coated amount of a positive electrode slurry and rolling conditions in a roll press machine were changed such that the thickness of a positive electrode after rolling was 50 µm and the density of a positive electrode active material layer was 3.4 g/cm$^3$.

In Comparative Example 3, negative electrodes were produced as in Example 1, except that a coated amount of a negative electrode slurry and rolling conditions in a roll press machine were changed such that the thickness of a negative electrode after rolling was 46 µm and the density of a negative electrode active material layer was 2.0 g/cm$^3$.

In Comparative Example 3, the nonaqueous electrolyte battery of Comparative Example 3 exhibiting a capacity similar to that in the nonaqueous electrolyte battery of Example 1 was manufactured by adjusting the number of positive electrodes to be used, the number of negative electrodes to be used, an area of the positive electrode active material layer, and an area of the negative electrode active material layer.

Comparative Example 4

In Comparative Example 4, a nonaqueous electrolyte battery of Comparative Example 4 was manufactured by procedures similar to those in Example 1 except for the following points.

First, in Comparative Example 4, positive electrodes were produced as in Example 1, except that a coated amount of a positive electrode slurry and rolling conditions in a roll press machine were changed such that the thickness of a positive electrode after rolling was 56 µm and the density of a positive electrode active material layer was 3.0 g/cm$^3$.

In Comparative Example 4, negative electrodes were produced as in Example 1; except that a coated amount of a negative electrode slurry and rolling conditions in a roll press machine were changed such that the thickness of a negative electrode after rolling was 44 µm and the density of a negative electrode active material layer was 2.1 g/cm$^3$.

In Comparative Example 4, the nonaqueous electrolyte battery of Comparative Example 4 exhibiting a capacity similar to that in the nonaqueous electrolyte battery of Example 1 was manufactured by adjusting the number of positive electrodes to be used, the number of negative electrodes to be used, an area of the positive electrode active material layer, and an area of the negative electrode active material layer.

Comparative Example 5

In Comparative Example 5, a nonaqueous electrolyte battery of Comparative Example 5 was manufactured by procedures similar to those in Example 1 except for the following points.

First, in Comparative Example 5, positive electrodes were produced as in Example 1; except that a coated amount of a positive electrode slurry and rolling conditions in a roll press machine were changed such that the thickness of a positive electrode after rolling was 46 µm and the density of a positive electrode active material layer was 3.3 g/cm$^3$.

In Comparative Example 5, negative electrodes were produced as in Example 1, except that a coated amount of a negative electrode slurry and rolling conditions in a roll press machine were changed such that the thickness of a negative electrode after rolling was 46 µm and the density of a negative electrode active material layer was 2.0 g/cm$^3$.

In Comparative Example 5, the nonaqueous electrolyte battery of Comparative Example 5 exhibiting a capacity similar to that in the nonaqueous electrolyte battery of Example 1 was manufactured by adjusting the number of positive electrodes to be used, the number of negative electrodes to be used, an area of the positive electrode active material layer, and an area of the negative electrode active material layer.

Comparative Example 6

In Comparative Example 6, a nonaqueous electrolyte battery of Comparative Example 6 was manufactured by procedures similar to those in Example 1 except that a nonaqueous electrolyte prepared by the following procedures was used instead of the nonaqueous electrolyte used in Example 1.

First, ethylene carbonate and diethyl carbonate were mixed at a volume ratio of 3:7 to prepare a nonaqueous solvent. Next, lithium hexafluorophosphate as an electrolyte was dissolved at a concentration of 1 mol/l in the nonaqueous solvent, thus obtaining a nonaqueous electrolyte. In the prepared nonaqueous electrolyte, the ion conductivity at 25° C. was 6.69 mS/cm.

Comparative Example 7

In Comparative Example 7, a nonaqueous electrolyte battery of Comparative Example 7 was manufactured by procedures similar to those in Example 1 except that a positive electrode was produced as described hereinafter.

First, in Comparative Example 7, as a positive electrode active material, a powder of lithium nickel cobalt aluminum composite oxide ($LiNi_{0.8}Co_{0.15}Mn_{0.05}O_2$) was provided. As in Example 1, acetylene black and graphite as conductive agents and polyvinylidene fluoride (PVdF) as a binder were provided. The lithium nickel cobalt aluminum composite oxide powder, acetylene black, graphite, and PVdF, which are provided, were added to N-methylpyrrolidone in a weight ratio of 87% by weight:5.0% by weight:3.0% by weight:5.0% by weight and mixed. Thus, a positive electrode slurry was prepared.

Next, the positive electrode slurry obtained after stirring was coated onto both surfaces of an aluminum foil having a thickness of 15 µm by a coater. In this case, a portion coated with no slurry was left on the aluminum foil. Next, an obtained coating was dried. Next, the dried coating was rolled by a roll press machine such that a thickness of a positive electrode was 46 µm and the density of a positive electrode active material layer was 3.0 g/cm$^3$. Finally, the portion coated with no slurry was punched to form a narrow portion as a positive electrode lead as shown in FIG. 3. Thus, positive electrodes were produced.

Comparative Example 8

In Comparative Example 8, a nonaqueous electrolyte battery of Comparative Example 8 was manufactured by procedures similar to those in Example 1 except for the following points.

First, in Comparative Example 8, graphite was used as a negative electrode active material. In Comparative Example 8, carbon black was used as a conductive aid, and polyvinylidene fluoride (PVdF) was used as a binder. In Comparative Example 8, graphite, carbon black, and PVdF were added to N-methylpyrrolidone in a weight ratio of 90% by weight:5% by weight:5% by weight and mixed. Thus, a negative electrode slurry was prepared.

Next, the negative electrode slurry obtained after stirring was coated onto both surfaces of a copper foil having a thickness of 10 μm by a coater. Next, an obtained coating was dried. Next, the dried coating was rolled by a roll press machine. Finally, the portion coated with no slurry was punched to form a narrow portion. Thus, negative electrodes were produced.

In the production of the positive electrode and the negative electrode, the coated amounts of the positive electrode slurry and the negative electrode slurry and the densities of the positive electrode active material layer and the negative electrode active material layer were adjusted such that the capacity ratio p/n between the positive electrode and the negative electrode was 1.5. When the capacity of the negative electrode is measured, the capacity was confirmed such that the cut-off charge potential of the negative electrode was set to 0.1 V (vs. Li/Li$^+$), and the cut-off discharge potential was set to 1.5 V (vs. Li/Li$^+$).

[Evaluation and Measurement]

The nonaqueous electrolyte batteries of Examples 2 to 12 and the nonaqueous electrolyte batteries of Comparative Examples 1 to 7 were subjected to the measurement and the evaluation according to procedures similar to those in the nonaqueous electrolyte battery of Example 1. Should be noted that the rate characteristics test and the charge-and-discharge cycle characteristics test in the nonaqueous electrolyte battery of Comparative Example 8 were conducted such that the cut-off charge voltage was set to 3.9 V, and the cut-off discharge voltage was set to 3.0 V.

The capacity retention on cycles of each of the nonaqueous electrolyte batteries of Examples 2 to 12 was not less than 90%.

Each nonaqueous electrolyte battery was subjected to three charge-and-discharge cycles to obtain a reference capacity. After that, the cut-off charge voltage was set to 2.8 V, and three charge-and-discharge cycles were performed, thus obtaining a full-charged capacity. For each nonaqueous electrolyte battery, a ratio $C_{2.4V}$ of the reference capacity to the full-charged capacity was obtained. As a result, in the nonaqueous electrolyte batteries of Examples 1 to 12, the ratio $C_{2.4V}$ was not less than 90%.

The results of measurement and evaluation in the nonaqueous electrolyte batteries of Examples 1 to 12 and the nonaqueous electrolyte batteries of Comparative Examples 1 to 7 were collectively shown in the following Tables 1 to 3. In Table 3, the results of the rate characteristics, initial resistance, resistance after cycles, and the resistance increase ratio of each nonaqueous electrolyte battery are shown as relative values based on "1.00" as the value of the nonaqueous electrolyte battery of Comparative Example 1.

TABLE 1

| | Positive Electrode | | | | Negative Electrode | | | |
| --- | --- | --- | --- | --- | --- | --- | --- | --- |
| | Thickness of Positive Electrode (μm) | Positive Electrode Active Material Layer | | | Thickness of Negative Electrode (μm) | Negative Electrode Active Material Layer | | |
| | | Active Material | Thickness $T_p$ (μm) | Porosity (%) | | Active Material | Thickness $T_n$ (μm) | Porosity (%) |
| Example 1 | 47 | $LiNi_{0.5}Co_{0.3}Mn_{0.2}O_2$ | 32 | 32 | 44 | $Li_4Ti_5O_{12}$ | 29 | 38 |
| Example 2 | 50 | $LiNi_{0.5}Co_{0.3}Mn_{0.2}O_2$ | 35 | 32 | 46 | $Li_4Ti_5O_{12}$ | 31 | 41 |
| Example 3 | 54 | $LiNi_{0.5}Co_{0.3}Mn_{0.2}O_2$ | 39 | 33 | 46 | $Li_4Ti_5O_{12}$ | 31 | 41 |
| Example 4 | 63 | $LiNi_{0.5}Co_{0.3}Mn_{0.2}O_2$ | 48 | 38 | 53 | $Li_4Ti_5O_{12}$ | 38 | 52 |
| Example 5 | 51 | $LiNi_{0.5}Co_{0.3}Mn_{0.2}O_2$ | 36 | 33 | 46 | $Li_4Ti_5O_{12}$ | 31 | 41 |
| Example 6 | 51 | $LiNi_{0.5}Co_{0.3}Mn_{0.2}O_2$ | 36 | 35 | 46 | $Li_4Ti_5O_{12}$ | 31 | 41 |
| Example 7 | 53 | $LiNi_{0.5}Co_{0.3}Mn_{0.2}O_2$ | 38 | 36 | 46 | $Li_4Ti_5O_{12}$ | 31 | 41 |
| Example 8 | 48 | $LiNi_{0.5}Co_{0.3}Mn_{0.2}O_2$ | 33 | 29 | 46 | $Li_4Ti_5O_{12}$ | 31 | 41 |
| Example 9 | 47 | $LiNi_{0.5}Co_{0.3}Mn_{0.2}O_2$ | 32 | 32 | 44 | $Li_4Ti_5O_{12}$ | 29 | 38 |
| Example 10 | 47 | $LiNi_{0.5}Co_{0.3}Mn_{0.2}O_2$ | 32 | 32 | 44 | $Li_4Ti_5O_{12}$ | 29 | 38 |
| Example 11 | 46 | $LiNi_{0.5}Co_{0.2}Mn_{0.3}O_2$ | 31 | 32 | 44 | $Li_4Ti_5O_{12}$ | 29 | 38 |
| Example 12 | 50 | $LiNi_{0.33}Co_{0.33}Mn_{0.33}O_2$ | 35 | 32 | 44 | $Li_4Ti_5O_{12}$ | 29 | 38 |
| Comparative Example 1 | 34 | $LiNi_{0.5}Co_{0.3}Mn_{0.2}O_2$ | 19 | 26 | 50 | $Li_4Ti_5O_{12}$ | 35 | 50 |
| Comparative Example 2 | 43 | $LiNi_{0.5}Co_{0.3}Mn_{0.2}O_2$ | 28 | 51 | 42 | $Li_4Ti_5O_{12}$ | 27 | 34 |
| Comparative Example 3 | 50 | $LiNi_{0.5}Co_{0.3}Mn_{0.2}O_2$ | 35 | 23 | 46 | $Li_4Ti_5O_{12}$ | 31 | 41 |
| Comparative Example 4 | 56 | $LiNi_{0.5}Co_{0.3}Mn_{0.2}O_2$ | 41 | 32 | 44 | $Li_4Ti_5O_{12}$ | 29 | 38 |
| Comparative Example 5 | 46 | $LiNi_{0.5}Co_{0.3}Mn_{0.2}O_2$ | 31 | 24 | 46 | $Li_4Ti_5O_{12}$ | 31 | 41 |
| Comparative Example 6 | 47 | $LiNi_{0.5}Co_{0.3}Mn_{0.2}O_2$ | 32 | 32 | 44 | $Li_4Ti_5O_{12}$ | 29 | 38 |
| Comparative Example 7 | 46 | $LiNi_{0.8}Co_{0.15}Al_{0.05}O_2$ | 31 | 32 | 44 | $Li_4Ti_5O_{12}$ | 29 | 38 |
| Comparative Example 8 | 117 | $LiNi_{0.5}Co_{0.3}Mn_{0.2}O_2$ | 102 | 42 | 59 | Graphite | 49 | 50 |

TABLE 2

| | Capacity Ratio (p/n) | Ratio of Thickness ($T_p/T_n$) | Ratio of Porosity per Thickness ($P_p/P_n$) | Ion-Conductivity at 25° C. of Nonaqueous Electrolyte (mS/cm) |
|---|---|---|---|---|
| Example 1 | 1.4 | 1.11 | 0.762 | 7.58 |
| Example 2 | 1.5 | 1.15 | 0.676 | 7.58 |
| Example 3 | 1.6 | 1.28 | 0.633 | 7.58 |
| Example 4 | 1.8 | 1.27 | 0.576 | 7.58 |
| Example 5 | 1.5 | 1.17 | 0.691 | 7.58 |
| Example 6 | 1.5 | 1.17 | 0.732 | 7.58 |
| Example 7 | 1.5 | 1.23 | 0.713 | 7.58 |
| Example 8 | 1.5 | 1.09 | 0.647 | 7.58 |
| Example 9 | 1.4 | 1.11 | 0.762 | 8.12 |
| Example 10 | 1.4 | 1.11 | 0.762 | 8.69 |
| Example 11 | 1.4 | 1.09 | 0.778 | 7.58 |
| Example 12 | 1.4 | 1.23 | 0.689 | 7.58 |
| Comparative Example 1 | 1.0 | 0.54 | 0.985 | 7.58 |
| Comparative Example 2 | 1.0 | 1.04 | 1.448 | 7.58 |
| Comparative Example 3 | 1.7 | 1.15 | 0.479 | 7.58 |
| Comparative Example 4 | 1.7 | 1.43 | 0.603 | 7.58 |
| Comparative Example 5 | 1.5 | 1.00 | 0.570 | 7.58 |
| Comparative Example 6 | 1.4 | 1.11 | 0.762 | 6.69 |
| Comparative Example 7 | 1.8 | 1.09 | 0.778 | 7.58 |
| Comparative Example 8 | 1.5 | 2.10 | 0.404 | 7.58 |

TABLE 3

| | Relative Value of Rate Characteristics | Relative Value of Initial Resistance | Relative Value of Resistance after Cycles | Relative Value of Resistance Increasing Ratio | Retention Ratio on Cycles | $C_{2.4 V}$ |
|---|---|---|---|---|---|---|
| Example 1 | 1.08 | 0.94 | 0.81 | 0.87 | 0.95 | 0.93 |
| Example 2 | 1.10 | 0.93 | 0.78 | 0.84 | 0.94 | 0.94 |
| Example 3 | 1.11 | 0.93 | 0.82 | 0.89 | 0.92 | 0.95 |
| Example 4 | 1.04 | 0.96 | 0.82 | 0.85 | 0.90 | 0.97 |
| Example 5 | 1.09 | 0.95 | 0.83 | 0.87 | 0.95 | 0.94 |
| Example 6 | 1.15 | 0.93 | 0.80 | 0.86 | 0.92 | 0.94 |
| Example 7 | 1.11 | 0.94 | 0.82 | 0.88 | 0.91 | 0.94 |
| Example 8 | 1.10 | 0.96 | 0.80 | 0.83 | 0.94 | 0.94 |
| Example 9 | 1.21 | 0.89 | 0.84 | 0.91 | 0.95 | 0.93 |
| Example 10 | 1.29 | 0.86 | 0.88 | 0.93 | 0.96 | 0.93 |
| Example 11 | 1.06 | 0.95 | 0.76 | 0.82 | 0.96 | 0.93 |
| Example 12 | 1.05 | 0.95 | 0.81 | 0.83 | 0.94 | 0.93 |
| Comparative Example 1 | 1.00 (Reference) | 1.00 (Reference) | 1.00 (Reference) | 1.00 (Reference) | 0.81 | 0.72 |
| Comparative Example 2 | 0.75 | 1.07 | 1.26 | 1.18 | 0.85 | 0.73 |
| Comparative Example 3 | 0.95 | 0.99 | 1.10 | 1.11 | 0.79 | 0.95 |
| Comparative Example 4 | 0.68 | 1.04 | 1.17 | 1.13 | 0.84 | 0.93 |
| Comparative Example 5 | 0.86 | 1.00 | 1.06 | 1.06 | 0.81 | 0.92 |
| Comparative Example 6 | 0.90 | 1.07 | 1.05 | 1.07 | 0.86 | 0.94 |
| Comparative Example 7 | 0.96 | 1.03 | 1.08 | 1.08 | 0.78 | 0.80 |
| Comparative Example 8 | 0.62 | 1.01 | 1.44 | 1.43 | 0.75 | 0.00 |

The above results show that the nonaqueous electrolyte batteries of Examples 1 to 12 could exhibit more excellent life characteristics and rate characteristics than the nonaqueous electrolyte batteries of Comparative Examples 1 to 8.

In each of Examples 1 to 4, the capacity ratio p/n was changed within a range of not less than 1.4 and not more than 1.8. The nonaqueous electrolyte batteries of Examples 1 to 4 similarly could exhibit excellent life characteristics and rate characteristics. On the other hand, in Comparative Examples 1 and 2, the capacity ratio p/n was 1.0. In the nonaqueous electrolyte batteries of Comparative Examples 1 and 2, it is considered that the positive electrode potential increased too much during charge.

In each of Examples 2, 5, and 6, the ratio $P_p/P_n$ between porosities of the electrode active material layers per thickness was changed within a range of not less than 0.55 and less than 0.8. In Examples 2, 7, and 8, the thickness ratio $T_p/T_n$ of the active material layers was changed within a range of not less than 1.05 and less than 1.3. The nonaqueous electrolyte batteries of Examples 2 and 5 to 8 similarly could exhibit excellent life characteristics and rate characteristics.

On the other hand, in each of Comparative Examples 1 to 3, the ratio $P_p/P_n$ between porosities of the electrode active material layers per thickness fell outside the range of not less than 0.55 and less than 0.8. In each of Comparative Examples 1 to 2 and 4 to 5, the thickness ratio $T_p/T_n$ of the active material layers fell outside the range of not less than 1.05 and less than 1.3. As a result, in the nonaqueous electrolyte batteries of Comparative Examples 1 to 5, it is considered that during the charge-and-discharge cycle, the distribution of the Li-ion concentration in the positive electrode active material layer and/or the negative electrode active material layer significantly biased.

In Examples 1, 9, and 10, the nonaqueous electrolytes in which the ion conductivities at 25° C. were different from each other but were within a range of 7 mS/cm to 10 mS/cm were used. The nonaqueous electrolyte batteries of Examples 1, 9, and 10 similarly could exhibit excellent life characteristics and rate characteristics.

On the other hand, in the nonaqueous electrolyte battery of Comparative Example 6 using the nonaqueous electrolyte in which the ion conductivity at 25° C. was 6.69 mS/cm, since the ion conductivity of the nonaqueous electrolyte was low, the rate characteristics and life characteristics were poor. The reason why the life characteristics were poor was that only when the ratio $T_p/T_n$ of the thickness of the active material layer is adjusted within the range of not less than 1.05 and less than 1.3, and the porosity ratio $P_p/P_n$ is adjusted within the range of not less than 0.55 and less than 0.8, if the ion conductivity of the nonaqueous electrolyte is not 7 mS/cm or more, the bias of the Li-ion concentration in the nonaqueous electrolyte increases.

In Examples 1, 11, and 12, lithium nickel cobalt manganese composite oxides having different compositions were used in the positive electrode. The nonaqueous electrolyte batteries of Examples 1, 11, and 12 similarly could exhibit excellent life characteristics and rate characteristics.

On the other hand, in Comparative Example 7, no lithium nickel cobalt manganese composite oxide was used. In the nonaqueous electrolyte battery of Comparative Example 7, since the positive electrode active material was different, the thickness ratio and the porosity ratio for balancing the lithium ion concentration were not appropriate, and the rate characteristics and the life characteristics were poor.

In Comparative Example 8, in order to adjust the capacity ratio p/n to fall within a range of not less than 1.4 and not more than 1.8, the production conditions of the positive electrode and the negative electrode were adjusted. However, a nonaqueous electrolyte battery in which the ratio $T_p/T_n$ of the thickness of the active material layers is within a range of not less than 1.05 and less than 1.3 and the ratio $P_p/P_n$ between porosities of the active material layers per 1 µm of a thickness of each active material layer is within a range of not less than 0.55 and less than 0.8 could not be obtained. In the nonaqueous electrolyte battery of Comparative Example 8, as seen in Table 3, the rate characteristics and the life characteristics were inferior to those of the nonaqueous electrolyte batteries of Examples 1 to 12.

As shown in Table 3, in the nonaqueous electrolyte batteries of Examples 1 to 12, the ratio $C_{2.4V}$ was not less than 90%. Namely, the nonaqueous electrolyte batteries of Examples 1 to 12 can exhibit an operating voltage range of not more than 2.4 V. A battery unit configured by connecting such nonaqueous electrolyte batteries to each other in series can exhibit excellent voltage compatibility with a battery unit including a lead-acid storage battery.

In the nonaqueous electrolyte batteries of Comparative Examples 3 to 6, although the ratio $C_{2.4V}$ was not less than 90%, the rate characteristics and the life characteristics were inferior to those of Examples. In such a battery, even if the voltage compatibility with a battery unit including a lead-acid storage battery is excellent, the characteristics of the battery itself are not excellent.

According to at least one of the embodiments and examples described above, there is provided a nonaqueous electrolyte battery including a positive electrode, a negative electrode, and a nonaqueous electrolyte. The positive electrode active material layer of the positive electrode includes a positive electrode active material of a lithium nickel cobalt manganese composite oxide. The negative electrode active material layer of the negative electrode includes a spinel type lithium titanate. The nonaqueous electrolyte has an ion conductivity of not less than 7 mS/cm and not more than 10 mS/cm at 25° C. In the nonaqueous electrolyte battery, a capacity ratio p/n is within a range of not less than 1.4 and not more than 1.8, the thickness ratio $T_p/T_n$ is within a range of not less than 1.05 and less than 1.3, and a porosity ratio $P_p/P_n$ is within a range of not less than 0.55 and less than 0.8. Due to these, the nonaqueous electrolyte battery according to the first embodiment can suppress oxidative degradation of the nonaqueous electrolyte, and further prevent occurrence of the bias of Li-ion concentration between a positive electrode and a negative electrode. As a result, the nonaqueous electrolyte battery according to the first embodiment can exhibit an excellent cycle life and an excellent rate characteristics.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A nonaqueous electrolyte battery comprising:
   a positive electrode comprising a positive electrode active material layer comprising lithium nickel cobalt manganese composite oxide;
   a negative electrode comprising a negative electrode active material layer comprising a spinel type lithium titanate; and
   a nonaqueous electrolyte having an ion conductivity of not less than 7 mS/cm and not more than 10 mS/cm at 25° C.,
   wherein a capacity ratio p/n is within a range of not less than 1.4 and not more than 1.8, where p is a capacity per unit area of the positive electrode, and n is a capacity per unit area of the negative electrode,
   a thickness ratio $T_p/T_n$ is within a range of not less than 1.05 and less than 1.3, where $T_p$ is a thickness of the positive electrode active material layer, and $T_n$ is a thickness of the negative electrode active material layer,
   a ratio $P_p/P_n$ is within a range of not less than 0.55 and less than 0.8, where $P_p$ is a porosity of the positive electrode active material layer per 1µm of the thickness of the positive electrode active material layer, and $P_n$ is a porosity of the negative electrode active material layer per 1 µm of the thickness of the negative electrode active material layer.

2. The nonaqueous electrolyte battery, according to claim 1, wherein the lithium nickel cobalt manganese composite oxide is represented by a composition formula of $Li_{1-a}Ni_xCo_yMn_zO_2$, where $0 \leq a \leq 1$, $x > 0$, $y > 0$, and $z > 0$, and x, y, and z satisfy an inequality of $0.1 \leq x/(y+z) \leq 1.3$.

3. The nonaqueous electrolyte battery, according to claim 1, wherein the porosity of the positive electrode active material layer is 40% or less.

4. The nonaqueous electrolyte battery, according to claim 1, wherein the density of the positive electrode active material layer is 2.9 g/cm³ or more.

5. The nonaqueous electrolyte battery, according to claim 1, wherein the nonaqueous electrolyte comprises a linear carbonate.

6. The nonaqueous electrolyte battery, according to claim 5, wherein the linear carbonate comprises ethylmethyl carbonate and/or dimethyl carbonate.

7. The nonaqueous electrolyte battery, according to claim 1, wherein the nonaqueous electrolyte comprises propylene carbonate.

8. The nonaqueous electrolyte battery, according to claim 2, wherein in the composition formula of the lithium nickel cobalt manganese composite oxide, x, y, and z satisfy inequalities of $0.3 \leq x/(y+z) \leq 1.3$ and $y \geq z$.

9. The nonaqueous electrolyte battery, according to claim 1, wherein wherein the nonaqueous electrolyte comprises a linear carbonate and a cyclic carbonate.

10. The nonaqueous electrolyte battery, according to claim 1, further comprising a container member accommodating the positive electrode, the negative electrode, and the nonaqueous electrolyte,
wherein the container member is a metallic container whose wall thickness is within a range of not less than 0.2 mm and not more than 1 mm.

11. A battery system comprising:
a first battery unit comprising a lead-acid storage battery; and
a second battery unit connected to the first battery unit in parallel and comprising the nonaqueous electrolyte battery according to claim 1.

12. The nonaqueous electrolyte battery, according to claim 1, wherein the density of the positive electrode active material layer falls within a range from 3.0 $g/cm^3$ to 3.4 $g/cm^3$.

13. The nonaqueous electrolyte battery, according to claim 1, wherein a density of the negative electrode active material layer is 1.8 $g/cm^3$ or more.

14. The nonaqueous electrolyte battery, according to claim 1, wherein the density of the negative electrode active material layer falls within a range from 1.9 $g/cm^3$ to 2.3 g/cm3.

* * * * *